United States Patent
Tsunematsu et al.

(10) Patent No.: US 11,208,563 B2
(45) Date of Patent: Dec. 28, 2021

(54) SURFACE-TREATED INFRARED ABSORBING FINE PARTICLES, SURFACE-TREATED INFRARED ABSORBING FINE POWDER, INFRARED ABSORBING FINE PARTICLE DISPERSION LIQUID USING THE SURFACE-TREATED INFRARED ABSORBING FINE PARTICLES, INFRARED ABSORBING FINE PARTICLE DISPERSION BODY AND METHOD FOR PRODUCING THEM

(71) Applicant: SUMITOMO METAL MINING CO., LTD., Tokyo (JP)

(72) Inventors: Hirofumi Tsunematsu, Isa (JP); Takeshi Chonan, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/763,635

(22) PCT Filed: Nov. 13, 2018

(86) PCT No.: PCT/JP2018/042016
§ 371 (c)(1),
(2) Date: May 13, 2020

(87) PCT Pub. No.: WO2019/093524
PCT Pub. Date: May 16, 2019

(65) Prior Publication Data
US 2021/0047518 A1 Feb. 18, 2021

(30) Foreign Application Priority Data
Nov. 13, 2017 (JP) .............................. JP2017-218520

(51) Int. Cl.
| | | |
|---|---|---|
| C09C 3/08 | (2006.01) |
| C08K 3/22 | (2006.01) |
| C08K 9/04 | (2006.01) |
| C09C 1/00 | (2006.01) |
| G02B 5/00 | (2006.01) |
| G02B 5/24 | (2006.01) |

(52) U.S. Cl.
CPC ................ *C09C 3/08* (2013.01); *C08K 3/22* (2013.01); *C08K 9/04* (2013.01); *C09C 1/00* (2013.01);
(Continued)

(58) Field of Classification Search
CPC .... C09C 3/08; C09C 1/00; C08K 3/22; C08K 9/04; C08K 2003/2258; G02B 5/003;
(Continued)

(56) References Cited

U.S. PATENT DOCUMENTS 6,416,890 B1  7/2002  Terneu et al.
8,083,847 B2  12/2011  Takeda et al.
(Continued)

FOREIGN PATENT DOCUMENTS

CN  102282229 A  12/2011
EP  2360220 A1  8/2011
(Continued)

OTHER PUBLICATIONS

Jan. 15, 2019 International Search Report issued in International Patent Application No. PCT/JP2018/042016.
(Continued)

*Primary Examiner* — Ling Siu Choi
*Assistant Examiner* — Ronald Grinsted
(74) *Attorney, Agent, or Firm* — Oliff PLC

(57) ABSTRACT

Surface-treated infrared-absorbing fine particles with excellent moisture and heat resistance and excellent infrared-absorbing properties, surface-treated infrared absorbing fine particle powder containing the surface-treated infrared
(Continued)

absorbing fine particles, an infrared absorbing fine particle dispersion liquid and an infrared absorbing fine particle dispersion body using the surface-treated infrared absorbing fine particles, and a method for producing them, wherein a surface of infrared absorbing particles is coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

23 Claims, 1 Drawing Sheet

(52) U.S. Cl.
CPC ............... *G02B 5/003* (2013.01); *G02B 5/24* (2013.01); *C01P 2002/76* (2013.01); *C01P 2004/04* (2013.01); *C08K 2003/2258* (2013.01)

(58) Field of Classification Search
CPC ......... G02B 5/24; G02B 5/26; C01P 2002/76; C01P 2004/04
USPC ........................................................ 252/587
See application file for complete search history.

(56) References Cited

U.S. PATENT DOCUMENTS

| | | |
|---|---|---|
| 2010/0210772 A1 | 8/2010 | Hiwatashi |
| 2011/0297899 A1* | 12/2011 | Tofuku .................. C01G 51/00 252/587 |
| 2014/0127522 A1 | 5/2014 | Fujita et al. |

FOREIGN PATENT DOCUMENTS

| | | |
|---|---|---|
| JP | H08-12378 A | 1/1996 |
| JP | H08-59300 A | 3/1996 |
| JP | H08-73223 A | 3/1996 |
| JP | H08-283044 A | 10/1996 |
| JP | H09-127559 A | 5/1997 |
| JP | 2000-119045 A | 4/2000 |
| JP | 2003-121884 A | 4/2003 |
| JP | 2008-291109 A | 12/2008 |
| JP | 2011-181636 A | 9/2011 |
| JP | 2012-077230 A | 4/2012 |
| JP | 2013-064093 A | 4/2013 |
| JP | 2017-155112 A | 9/2017 |
| WO | 2005/037932 A1 | 4/2005 |
| WO | 2010/055570 A1 | 5/2010 |
| WO | 2012/140896 A1 | 10/2012 |

OTHER PUBLICATIONS

Dec. 31, 2020 Office Action issued in Indian Patent Application No. 202047024163.

Oct. 9, 2020 Office Action issued in Australian Patent Application No. 2018365930.

Jingxiao Liu et. al. "Dispersion of Cs0,33WO3 Particles for Preparing Its Coatings With Higher Near Infrared Shielding Properties;" Applied Surface Science; vol. 309; May 9, 2014; pp. 175-180.

Jun. 18, 2021 Extended European Search Report issued in European Patent Application No. 18875199.4.

* cited by examiner

SURFACE-TREATED INFRARED ABSORBING FINE PARTICLES, SURFACE-TREATED INFRARED ABSORBING FINE POWDER, INFRARED ABSORBING FINE PARTICLE DISPERSION LIQUID USING THE SURFACE-TREATED INFRARED ABSORBING FINE PARTICLES, INFRARED ABSORBING FINE PARTICLE DISPERSION BODY AND METHOD FOR PRODUCING THEM

TECHNICAL FIELD

The present invention relates to surface-treated infrared absorbing fine particles with their surfaces coated with a predetermined coating layer, which are infrared absorbing fine particles that transmit light in a visible light region and absorb light in an infrared region, surface-treated infrared-absorbing fine particle powder containing the surface-treated infrared-absorbing fine particles, infrared absorbing fine particle dispersion liquid using the surface-treated infrared absorbing fine particles, infrared absorbing fine particle dispersion body and a method for producing them.

DESCRIPTION OF RELATED

In recent years, a demand for infrared absorbers has been rapidly increasing, and many patents on infrared absorbers have been proposed. Looking at these proposals from a functional perspective, for example, in a field of window materials for various buildings and vehicles, there are infrared absorbers for the purpose of shielding near-infrared light while sufficiently taking in visible light, to suppress a rise in indoor temperature while maintaining brightness, and for the purpose of preventing malfunctions in cordless phones and remote controls of home appliances caused by infrared light radiated forward from PDP (Plasma Display Panel) thereby adversely affecting transmission optical communications, and the like.

Further, from a perspective of a light-shielding member, for example, inorganic pigments such as carbon black and titanium black, which have absorption properties in the near infrared region from the visible: light region, and a light-shielding film containing a black pigment containing an organic pigment such as aniline black that has strong absorption properties only in the visible light region, and a half-mirror-type light shielding member on which a metal such as aluminum is deposited, are proposed as a light shielding member used for window materials, etc.

For example, patent document 1 discloses an infrared shielding glass that can be suitably used for parts requiring high visible light transmittance and good infrared shielding performance, by providing a composite tungsten oxide layer containing at least one metal ion selected from a group consisting of Group IIIa, Group IVa, Group Vb, Group VIb and Group VIIb of a periodic table as a first layer on a transparent glass substrate from the substrate side, providing a transparent dielectric layer as a second layer on the first layer, and providing a composite tungsten oxide layer containing at least one metal ion selected from the group consisting of Group IIIa, Group IVa, Group Vb, Group VIb and Group VIIb of the periodic table as a third layer on the second layer, and making a refractive index of the transparent dielectric layer of the second layer lower than that of the composite tungsten oxide layer of the first layer and the third layer.

Further, patent document 2 discloses an infrared shielding glass in which a first dielectric layer is provided as a first layer on a transparent glass substrate from the substrate side, and a tungsten oxide layer is provided as a second layer on the first layer, and a second dielectric layer is provided as a third layer on the second layer in the same manner as in patent document 1.

Further, patent document 3 discloses a heat ray shielding glass in which a composite tungsten oxide layer containing the same metal element as in patent document 1 is provided as a first layer on a transparent substrate from the substrate side, and a transparent dielectric layer is provided as a second layer on the first layer.

Further, patent document 4 discloses a solar control glass sheet with solar shielding properties, which is formed by being coated with a metal oxide layer by a CVI) method or a spray method and subjected to thermal decomposition at 250° C., the metal oxide layer being selected from one or more kinds of tungsten trioxide ($WO_3$) containing additional elements such as hydrogen, lithium, sodium or potassium, molybdenum trioxide ($MoO_3$), niobium pentoxide ($Nb_2O_5$), tantalum pentoxide ($Ta_2O_5$), vanadium pentoxide ($V_2O_5$) and vanadium dioxide ($VO_2$).

Further, patent document 5 discloses a solar tunable optical insulation material in which tungsten oxide obtained by hydrolyzing tungstic acid is used, and an organic polymer having a specific structure called polyvinylpyrrolidone is added to the tungsten oxide. When the solar tunable light insulation material is irradiated with sunlight, ultraviolet rays in the light is absorbed by the tungsten oxide to generate excited electrons and holes, an appearance amount of pentavalent tungsten is significantly increased due to a small amount of ultraviolet rays, and a coloring reaction is accelerated, accordingly, a coloring concentration is increased. On the other hand, by shielding the light, the pentavalent tungsten is very quickly oxidized to hexavalent and a decoloring reaction is accelerated. It is proposed that by using the coloring/decoloring properties, the coloring and decoloring reactions to sunlight are fast, an absorption peak appears at a wavelength of 1250 nm in the near infrared region at the time of coloring, and a solar tunable optical insulation material capable of shielding the near-infrared light of sunlight can be obtained.

On the other hand, the present inventors disclose in patent document 6 that tungsten oxide fine powder including tungsten trioxide or its hydrate or a mixture of both is obtained by dissolving tungsten hexachloride in alcohol and evaporating a medium as it is, or evaporating the medium after heating to reflux and applying heat treatment thereafter at 100° C. to 500° C., and disclose that an electrochromic device can be obtained using the tungsten oxide fine particles, and when a multi-layered laminate is formed and protons are introduced into the layer, the optical properties of the layer can be changed.

Further, patent document 7 discloses a method for producing various tungsten bronze represented by $M_xWO_3$ (M; metal element such as alkali, alkaline earth, rare earth, satisfying $0<x<1$), by using a meta-type ammonium tungstate and various water-soluble metal salts as raw materials, heating a dried product of a mixed aqueous solution at a heating temperature of about 300 to 700° C., and supplying hydrogen gas to which inert gas (addition amount: about 50 vol % or more) or steam (addition amount: about 15 vol % or less) is added during this heating, and discloses a method for producing various tungsten bronze coated composites by performing the same operation on a supporting body, so as to be used as an electrode catalyst material for fuel cells, etc.

Further, the present inventors disclose in patent document 8 an infrared shielding material fine particle dispersion body in which infrared shielding material fine particles are dispersed in a medium, excellent optical properties, conductivity and a method for producing the infrared shielding material fine particle dispersion body. Above all, the infrared shielding properties were more excellent than those of conventional shielding materials. The infrared shielding material fine particles are composite tungsten oxide fine particles represented by a general formula WyOz (where W is tungsten, O is oxygen, satisfying 2.2≤z/y≤2.999), and/or composite tungsten oxide fine particles represented by a general formula MxWyOz (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Re, Be, Hf, Os, Bi, I, W is tungsten, O is oxygen, satisfying 0.001≤x/y≤1, 2.2≤z/y≤3.0), and a particle size of the infrared shielding material fine particles is 1 nm or more and 800 nm or less.

PRIOR ART DOCUMENT

Patent Document

[Patent Document 1] JP-A-8-59300
[Patent Document 2] JP-A-8-12378
[Patent Document 3] JP-A-8-283044
[Patent Document 4] JP-A-2000-119045
[Patent Document 5] JP-A-9-127559
[Patent Document 6] JP-A-2003-121884
[Patent Document 7] JP-A-8-73223
[Patent Document 8] International Publication No. 2005/37932
[Patent Document 9] International Publication No. 2010/55570

SUMMARY OF THE INVENTION

Problem to be Solved by the Invention

According to studies by the present inventors, it is found that in an optical member (film, resin sheet, etc.) containing the tungsten oxide fine particles, and/or composite tungsten oxide fine particles, steam in the air and water gradually penetrate into a solid resin contained in the optical member, depending on usage conditions and methods. It is also found that when steam and water gradually penetrate into the solid resin, there is a problem that a surface of the tungsten oxide fine particles is decomposed, then, a transmittance of light having a wavelength of 200 to 2600 nm increases with time, and an infrared absorption performance of the optical member gradually decreases. The solid resin is a polymer medium that is solid at room temperature, including polymer media other than those that are three-dimensionally crosslinked (it may be described as "matrix resin" in the present invention).

Under the above-described circumstance, the present inventors disclose in patent document 9 infrared shielding fine particles with excellent water resistance and excellent infrared shielding properties, which are tungsten oxide particles represented by a general formula WyOz and/or composite tungsten oxide fine particles represented by a general formula MxWyOz, wherein an average primary particle size of the fine particles is 1 nm or more and 800 nm or less, and a surface of the fine particles is coated with a tetrafunctional silane compound or a partial hydrolysis product thereof, and/or an organometallic compound, and disclose a method for producing them.

However, infrared absorbing materials are basically used outdoors because of their properties, and often require high weather resistance. Then, as a demand in the market has been increasing year by year, the infrared shielding fine particles disclosed in Patent Document 9 have been required to be further improved in water resistance and moisture and heat resistance.

Under the above-described circumstance, the present invention is provided, and an object of the present invention is to provide surface-treated infrared-absorbing fine particles with excellent moisture and heat resistance and excellent infrared-absorbing properties, a surface-treated infrared absorbing fine particle powder containing the surface-treated infrared absorbing fine particles, an infrared absorbing fine particle dispersion liquid and an infrared absorbing fine particle dispersion body using the surface-treated infrared absorbing fine particles, and a method for producing them.

Means for Solving the Problem

In order to solve the above-described problem, the present inventors study on the following configuration: the tungsten oxide fine particles or/and composite tungsten oxide fine particles having excellent optical properties are used as infrared absorbing fine particles, to improve the moisture and heat resistance and chemical stability of the infrared absorbing fine particles. As a result, it is found that it is important to coat a surface of each infrared absorbing fine particle, using a compound that has excellent affinity with the surface of the infrared absorbing fine particles, and is uniformly adsorbed on the surface of the individual infrared absorbing fine particles to form a strong coating layer After further study by the present inventors, a metal chelate compound and a metal cyclic oligomer compound are found to be a compound that has excellent affinity with a surface of the infrared absorbing fine particles to form a coating layer as described above. As a result of further study, hydrolysis products of these metal chelate compound and metal cyclic oligomer compound formed when these compounds are hydrolyzed, or polymer of hydrolysis product is uniformly adsorbed on the surface of the individual infrared absorbing fine particles, to form a strong coating layer.

Namely, the present invention provides the infrared absorbing fine particles (it may be referred to as "surface-treated infrared absorbing fine particles" in the present invention) which are the tungsten oxide fine particles and/or the composite tungsten oxide fine particles with their surfaces coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound. Then, it is found that the surface-treated infrared absorbing fine particles have excellent moisture and heat resistance.

Further, it is found that the surface-treated infrared absorbing fine particles and the surface-treated infrared-absorbing fine particle powder containing the surface-treated infrared absorbing fine particles, and the infrared absorbing fine particle dispersion body produced using the infrared absorbing fine particle dispersion liquid in which the surface-treated infrared absorbing fine particles are dispersed in an appropriate medium, and the like have excellent moisture and heat resistance and excellent infrared absorption properties. Thus, the present invention is provided.

Namely, in order to solve the above-described problem, a first invention provides surface-treated infrared absorbing fine particles, wherein a surface of infrared absorbing particles is coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

A second invention provides the surface-treated infrared absorbing fine particles according to the first invention, wherein a thickness of the coating layer is 0.5 nm or more.

A third invention provides the surface-treated infrared absorbing fine particles according to the first or second invention, wherein the metal chelate compound or the metal cyclic oligomer compound contains at least one metal element selected from Al, Zr, Ti, Si, Zn.

A fourth invention provides the surface-treated infrared absorbing fine particles according to any one of the first to third inventions, wherein the metal chelate compound or the metal cyclic oligomer compound has at least one selected from an ether bond, an ester bond, an alkoxy group, and an acetyl group.

A fifth invention provides the surface-treated infrared absorbing fine particles according to any one of the first to fourth inventions, wherein the infrared absorbing fine particles are the infrared absorbing fine particles represented by a general formula $W_yO_z$ (where W is tungsten, O is oxygen, satisfying $2.2 \leq z/y \leq 2.999$), and/or a general formula $M_xW_yO_z$ (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, and W is tungsten, is oxygen, satisfying $0.001 \leq x/y \leq 1$, $2.2 \leq z/y \leq 3.0$).

A sixth invention provides a surface-treated infrared absorbing fine particle powder containing the surface-treated infrared absorbing fine particles of any one of the first to fifth inventions.

A seventh invention provides the surface-treated infrared absorbing fine particle powder according to the sixth invention, wherein a carbon concentration is 0.2 mass % or more and 5.0 mass % or less.

An eighth invention provides an infrared-absorbing fine particle dispersion liquid, wherein the surface-treated infrared absorbing fine particles of any one of the first to fifth inventions are dispersed in a predetermined liquid medium.

A ninth invention provides the infrared absorbing fine particle dispersion liquid according to the eighth invention, wherein the liquid medium is at least one liquid medium selected from an organic solvent, oil and fat, a liquid plasticizer, a compound polymerized by curing, and water.

A tenth invention provides an infrared-absorbing fine particle dispersion body, wherein the surface-treated infrared absorbing fine particles of any one of the first to fifth inventions are dispersed in a predetermined solid resin.

An eleventh invention provides the infrared absorbing fine particle dispersion body according to the tenth invention, wherein the solid resin is at least one resin selected from a fluororesin, PET resin, acrylic resin, polyamide resin, vinyl chloride resin, polycarbonate resin, olefin resin, epoxy resin, and polyimide resin.

A twelfth invention provides an infrared absorbing fine particle dispersion body, which is a dried and solidified product of the infrared absorbing fine particle dispersion liquid of the eighth or ninth invention.

A thirteenth invention provides a method for producing surface-treated infrared absorbing tine particles, including:

mixing infrared absorbing fine particles and water, and performing a dispersion treatment to obtain a coating layer-forming dispersion liquid with water as a medium;

adding a metal chelate compound and/or a metal cyclic oligomer compound while stirring the coating layer-forming dispersion liquid with water as a medium;

continuing the stirring after the addition, and coating a surface of the infrared absorbing fine particles with at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound, to obtain an infrared absorbing fine particle dispersion liquid.

A fourteenth invention provides a method for producing surface-treated infrared absorbing fine particles, including:

mixing infrared absorbing fine particles and an organic solvent, performing a dispersion treatment, to obtain a coating layer-forming dispersion liquid with the organic solvent as a medium;

simultaneously adding a metal chelate compound or/and a metal cyclic oligomer compound and water in parallel while stirring the coating layer-forming dispersion liquid with the organic solvent as a medium;

continuing the stirring after the addition, and coating a surface of the infrared absorbing tine particles with at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound, to obtain an organic solvent dispersion liquid of infrared absorbing fine particles.

A fifteenth invention provides the method for producing the surface-treated infrared absorbing fine particles according to the thirteenth or fourteenth invention, wherein the metal chelate compound and/or the metal cyclic oligomer compound contains at least one metal element selected from Al, Zr, Ti, Si, and Zn.

A sixteenth invention provides the method for producing surface-treated infrared absorbing fine particles according to any one of the thirteenth to fifteenth inventions, wherein the infrared absorbing fine particles are the infrared absorbing fine particles represented by a general formula $W_yO_z$ (where W is tungsten, O is oxygen, satisfying $2.2 \leq z/y \leq 2.999$), and/or a general formula $M_xW_yO_z$ (where M is one or more elements selected from H, He, alkali metal, alkaline earth metal, rare earth element, Mg, Zr, Cr, Mn, Ru, Co, Rh, Ir, Ni, Pd, Pt, Cu, Ag, Au, Zn, Cd, Ga, In, Tl, Si, Ge, Sn, Pb, Sb, B, P, S, Se, Br, Te, Ti, Nb, V, Mo, Ta, Re, Be, Hf, Os, Bi, I, Yb, W is tungsten, O is oxygen, satisfying $0.001 \leq x/y \leq 1$, $2.2 \leq z/y \leq 3.0$).

A seventeenth invention provides a method for producing a surface-treated infrared absorbing fine particle powder; including:

removing a medium from the coating layer-forming dispersion liquid with water as a medium according to the thirteenth, fifteenth or sixteenth invention, or the coating layer-forming dispersion liquid with the organic solvent as a medium according to any one of the fourteenth to sixteenth inventions, to obtain a surface-treated infrared absorbing fine particle powder containing surface-treated infrared absorbing fine particles.

An eighteenth invention provides a method for producing a surface-treated infrared absorbing fine particle powder according to the seventeenth invention, wherein a concentration of carbon contained in the surface-treated infrared absorbing fine particle powder is 0.2 mass % or more and 5.0 mass % or less.

A nineteenth invention provides a method for producing an infrared absorbing fine particle dispersion liquid, including:

adding the surface-treated infrared absorbing fine particle powder of the seventeenth or eighteenth invention to a predetermined medium and dispersing the same.

A twentieth invention provides a method for producing an infrared absorbing fine particle dispersion liquid, including:

exchanging the medium of the dispersion liquid to a predetermined medium, the dispersion liquid being the coating layer-forming dispersion liquid with water as a medium according to the thirteenth, fifteenth, or sixteenth invention, or the coating layer-forming dispersion liquid with an organic solvent as a medium according to any one of the fourteenth to sixteenth inventions.

A twenty-first invention provides a method for producing an infrared absorbing fine particle dispersion liquid, including:

exchanging the medium of the dispersion liquid to a predetermined medium in advance, the dispersion liquid being the coating layer-forming dispersion liquid with water as a medium according to the thirteenth, fifteenth, or sixteenth invention, or the coating layer-forming dispersion liquid with an organic solvent as a medium according to any one of claims 14 to 16; thereby using the resulting dispersion liquid as an infrared absorbing fine particle dispersion liquid, the resulting dispersion liquid being the coating layer-forming dispersion liquid with water as a medium according to the thirteenth, fifteenth, or sixteenth invention or the coating layer-forming dispersion liquid with an organic solvent as a medium according to any one of the fourteenth to sixteenth inventions.

A twenty-second invention provides a method for producing an infrared absorbing fine particle dispersion body, including:

coating a surface of a predetermined substrate with the infrared-absorbing fine particle dispersion liquid obtained by the method for producing an infrared-absorbing fine particle dispersion liquid according to any one of the nineteenth to twenty-first inventions and drying the same, to obtain an infrared absorbing fine particle dispersion body.

A twenty-third invention provides a method for producing an infrared absorbing fine particle dispersion body, including:

dispersing in a predetermined solid resin either one of the surface-treated infrared absorbing fine particle powder obtained by the method for producing a surface-treated infrared absorbing fine particle powder according to the seventeenth or eighteenth invention, or the infrared absorbing fine particle dispersion liquid obtained by the method for producing an infrared absorbing fine particle dispersion liquid according to any one of the nineteenth to twenty-first inventions.

Advantage of the Invention

An infrared absorbing fine particle dispersion body having high moisture and heat resistance and excellent infrared absorbing properties can be obtained, by using the surface-treated infrared absorbing fine particles according to the present invention.

DETAILED DESCRIPTION OF THE INVENTION

Figure 1:
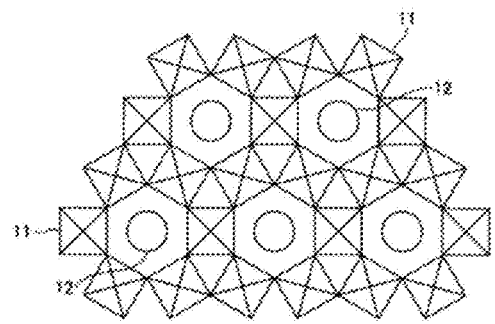
FIG. 1 is a schematic plan view of a crystal structure of a composite tungsten oxide having a hexagonal crystal structure.

Surface-treated infrared absorbing fine particles according to the present invention are the surface-treated infrared absorbing fine particles in which surfaces of tungsten oxide fine particles or/and composite tungsten oxide fine particles which are infrared absorbing fine particles, are coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

The present invention will be more specifically described hereafter in an order of [1] Infrared absorbing fine particles, [2] A surface treating agent used for surface coating of infrared absorbing fine particles, [3] A surface coating method of infrared absorbing fine particles, [4] Infrared absorbing fine particle dispersion body, infrared absorbing substrate, and article obtained using surface-treated infrared absorbing fine particles.

Note that in the present invention, "a coating layer formed using at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound, on the surfaces of the fine particles to impart moisture and heat resistance to the infrared absorbing fine particles" may be simply described as "a coating layer".

[1] Infrared Absorbing Fine Particles

Generally, it is known that a material containing free electrons exhibits a reflection-absorption response to an electromagnetic wave around a solar ray region having a wavelength of 200 nm to 2600 nm due to plasma vibration. It is known that when powder of such a substance is made into particles smaller than a wavelength of light, geometric scattering in a visible light region (wavelength 380 nm to 780 nm) is reduced, and transparency in the visible light region is obtained.

Note that in the present invention, the term "transparency" is used to mean "there is little scattering and high transmittance with respect to light in the visible light region".

Generally, there are no effective free electrons in tungsten oxide ($WO_3$), and therefore $WO_3$ has little absorption and reflection properties in the infrared region, and is not effective as infrared absorption fine particles.

On the other hand, it is known that $WO_3$ having oxygen deficiency or composite tungsten oxide obtained by adding a positive element such as Na to $WO_3$ is a conductive material and a material having free electrons. Then, analysis of a single crystal or the like of a material having these free electrons suggests a response of the free electrons to light in the infrared region.

The present inventors found that there is a particularly effective range as infrared absorbing fine particles in a specific portion of a composition range of the tungsten and oxygen, and conceived of tungsten oxide fine particles, composite tungsten oxide fine particles that are transparent in the visible light region and having absorption in the infrared region.

Here, the tungsten oxide fine particles and/or the composite tungsten oxide fine particles which are infrared absorbing fine particles according to the present invention will be described in an order of (1) Tungsten oxide fine particles, (2) Composite tungsten oxide fine particles, (3) Tungsten oxide fine particles and composite tungsten oxide fine particles.

(1) Tungsten Oxide Fine Particles

The tungsten oxide fine particles according to the present invention are fine particles of tungsten oxide represented by a general formula WyOz (W is tungsten, O is oxygen, and satisfying $2.2 \leq z/y \leq 2.999$).

In the tungsten oxide represented by the general formula WyOz, the composition range of tungsten and oxygen is such that a composition ratio of oxygen to tungsten is less than 3, and preferably $2.2 \leq z/y \leq 2.999$ when the infrared absorbing fine particles are described as WyOz.

When the value of z/y is 2.2 or more, an appearance of a $WO_2$ crystal phase other than an intended one in the tungsten oxide can be avoided, and it is possible to obtain chemical stability as a material, and therefore the tungsten oxide becomes an effective infrared absorbing fine particles. On the other hand, when the value of z/y is 2.999 or less, a required amount of free electrons is generated, resulting in efficient infrared absorbing fine particles.

(2) Composite Tungsten Oxide Fine Particles

By adding element M described later to the above $WO_3$ to form a composite tungsten oxide, free electrons are generated in the $WO_3$, strong absorption properties derived from free electrons are exhibited particularly in the near-infrared region, and the above composite tungsten oxide is effective as near-infrared absorbing fine particles for near-infrared ray near 1000 nm.

Namely, for $WO_3$, by performing both control of an oxygen amount and addition of the element M that generates free electrons, more efficient infrared absorbing fine particles can be obtained. Infrared absorbing fine particles obtained by performing both the control of the oxygen amount and the addition of an element M that generates free electrons are represented by a general formula MxWyOz (where M is M element, W is tungsten, and O is oxygen) in which a relation of x, y, z is preferably in a range of $0.001 \leq x/y \leq 1$, $2.0 \leq z/y \leq 3$.

First, the value of x/y indicating an addition amount of the element M will be described.

When the value of x/y is larger than 0.001, a sufficient amount of free electrons is generated in the composite tungsten oxide, and a desired infrared absorption effect can be obtained. Then, as the addition amount of the element M increases, a supply amount of free electrons increases, and infrared absorption efficiency also increases, but when the value of x/y is about 1, the effect is saturated. Further, when the value of x/y is smaller than 1, it is preferable to avoid generation of an impurity phase in the infrared absorbing fine particles.

The element M is preferably one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, Mo, Ta, Re, Be, Hf, Os, Bi, I, and Yb.

Here, the M element is preferably one or more kinds selected from alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, from a viewpoint of stability in the MxWyOz to which the element M is added. In addition, the element M more preferably belongs to an alkaline earth metal element, a transition metal element, a 4B group element, or a 5B group element, from a viewpoint of improving optical properties and weather resistance as infrared absorbing fine particles.

Next, values of z/y indicating the control of the oxygen amount will be described. In the composite tungsten oxide represented by MxWyOz, the same mechanism as the above-described tungsten oxide represented by WyOz works, and in addition, when $z/y=3.0$ or $2.0 \leq z/y \leq 2.2$, there is a supply of free electrons depending on the amount of the element M described above. Therefore, the values of z/y is preferably $2.0 \leq z/y \leq 3.0$, more preferably $2.2 \leq z/y \leq 3.0$, and further more preferably $2.45 \leq z/y \leq 3.0$.

Further, when the composite tungsten oxide fine particles have a hexagonal crystal structure, the transmission of the fine particles in the visible light region is improved, and the absorption of the fine particles in the infrared region is improved. This will be described with reference to FIG. 1 which is a schematic plan view of the hexagonal crystal structure.

In FIG. 1, a hexagonal void is formed by assembling six hexahedrons formed by units of $WO_6$ indicated by reference numeral 11. Then, the element M indicated by reference numeral 12 is arranged in the void to constitute one unit, and a large number of these units gather to form a hexagonal crystal structure.

In order to obtain the effect of improving light transmission in the visible light region and improving light absorption in the near-infrared region, a unit structure described using FIG. 1 may be included in the composite tungsten oxide fine particles, and the composite tungsten oxide fine particles may be crystalline or amorphous.

When the cation of the element M is present in the hexagonal voids, the light transmission in the visible light region is improved, and the light absorption in the infrared region is improved. Here, generally, when an element M having a large ionic radius is added, the hexagonal crystal is easily formed. Specifically, when Cs, K, Rb, Tl, In, Ba, Li, Ca, Sr, Fe, and Sn are added, a hexagonal crystal is easily formed. Of course, other elements may be used as long as the above-described element M is present in the hexagonal voids formed by $WO_6$ units, and is not limited to the above-described elements.

When the composite tungsten oxide fine particles having a hexagonal crystal structure have a uniform crystal structure, the addition amount of the additional element M is preferably 0.2 or more and 0.5 or less, and more preferably 0.33 in terms of x/y. It is considered that when the value of x/y is 0.33, the above-described element M is arranged in all the hexagonal voids.

Further, tetragonal and cubic composite tungsten oxides are also effective as infrared absorbing fine particles, other than hexagonal. An absorption position in the infrared region tends to change depending on the crystal structure, and the absorption position tends to shift to a longer wavelength side in an order of cubic crystal<tetragonal crystal<hexagonal crystal. Further, accompanying such a tendency, hexagonal crystal, tetragonal crystal, and cubic crystal in this order, have low absorption in the visible light region. Accordingly, it is preferable to use a hexagonal composite tungsten oxide for applications that transmit more visible light and shield more infrared light. However, the present invention is not limited thereto and the tendency of the optical properties described here is only a rough tendency, and is varied depending on the kind of the added element, an addition amount and an oxygen amount.

(3) Tungsten Oxide Fine Particles and Composite Tungsten Oxide Fine Particles

The infrared absorbing fine particles containing tungsten oxide fine particles or composite tungsten oxide fine particles according to the present invention largely absorb light in the near-infrared region, particularly near the wavelength of 1000 nm, and therefore a transmission color tone thereof is often from blue to green.

Further, a dispersed particle size of the tungsten oxide fine particles or the composite tungsten oxide fine particles in the infrared absorbing fine particles can be selected depending on the purpose of use.

First, when used in applications where transparency is desired to be maintained, the particles preferably have a particle size of 800 nm or less. This is because particles smaller than 800 nm do not completely shield light due to scattering, and maintain visibility in the visible light region, and at the same time, maintain transparency efficiently. Particularly, when importance is placed on transparency in the visible light region, it is preferable to further consider scattering by particles.

When importance is placed on a reduction of scattering by the particles, the dispersed particle size is preferably 200 nm or less, and more preferably 100 nm or less. This is because when the dispersed particle size of the particles is small, scattering of light in the visible light region having a wavelength of 400 nm to 780 nm due to geometric scattering or Mie scattering is reduced, and as a result, it is possible to avoid a situation such that an infrared absorbing layer becomes like frosted glass, and clear transparency cannot be obtained. Namely, this is because when the dispersed particle size is 200 nm or less, the geometric scattering or Mie scattering is reduced, and a Rayleigh scattering region is formed. In the Rayleigh scattering region, the scattered light decreases in proportion to a sixth power of the particle size, and therefore scattering is reduced and transparency is improved as the dispersed particle size decreases.

Further, when the dispersed particle size becomes 100 nm or less, scattered light is very small, which is preferable. From a viewpoint of avoiding light scattering, it is preferable that the dispersed particle size is small, and when the dispersed particle size is 1 nm or more, industrial production is easy.

By setting the dispersed particle size to 800 nm or less, the haze value of the infrared absorbing fine particle dispersion body in which the infrared absorbing fine particles according to the present invention are dispersed in a medium, can be 30% when visible light transmittance is 85% or less. When the haze value is larger than 30%, the infrared absorbing fine particle dispersion body becomes like a frosted glass, and clear transparency cannot be obtained.

Note that the dispersed particle size of the infrared absorbing fine particles can be measured using ELS-8000 manufactured by Otsuka Electronics Co., Ltd based on a dynamic light scattering method.

Further, in the tungsten oxide fine particles and the composite tungsten oxide fine particles, a so-called "Mag-neli phase" having a composition ratio represented by $2.45 \leq z/y \leq 2.999$ is chemically stable, and an absorption property in the near-infrared region is good. Therefore, the tungsten oxide fine particles and the composite tungsten oxide fine particles are preferable as near-ultrafine absorbing particles.

Further, from a viewpoint of exhibiting excellent near-infrared absorption properties, the crystallite size of the infrared absorbing fine particles is preferably 1 nm or more and 200 nm or less, more preferably 1 nm or more and 100 nm or less, and further preferably 10 nm or more and 70 nm or less. For the measurement of the crystallite size, measurement of an X-ray diffraction pattern by a powder X-ray diffraction method ($\theta$–$2\theta$ method) and analysis by a Rietveld method are used. The measurement of the X-ray diffraction pattern can be performed using, for example, a powder X-ray diffractometer "X'Pert-PRO/MPD" manufactured by SPECTALY CORPORATION.

[2] Surface Treating Agent Used for Surface Coating of Infrared Absorbing Fine Particles A surface treating agent used for a surface coating of the infrared absorbing fine particles according to the present invention is at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

Then, the metal chelate compound and the metal cyclic oligomer compound are preferably metal alkoxide, metal acetylacetonate, and metal carboxylate, and from this viewpoint, preferably has at least one selected from an ether bond, an ester bond, an alkoxy group, and an acetyl group.

The surface treating agent according to the present invention will be described hereafter in an order of (1) Metal chelate compound, (2) Metal cyclic oligomer compound, (3) Hydrolysis product and polymer of metal chelate compound and metal cyclic oligomer compound, and (4) addition amount of surface treating agent.

(1) Metal Chelate Compound

The metal chelate compound used in the present invention is preferably one or more selected from Al-based, Zr-based, Ti-based, Si-based, and Zn-based chelate compounds containing an alkoxy group.

The aluminum chelate compound includes for example: aluminum alcoholates such as aluminum ethylate, aluminum isopropylate, aluminum sec-butylate, mono-sec-butoxyaluminum diisopropylate or these polymers, ethyl acetoacetate aluminum diisopropylate, aluminum tris (ethyl acetoacetate), octyl acetoacetate aluminum diisopropylate, stearyl acetoaluminum diisopropylate, aluminum monoacetylacetonate bis (ethylacetoacetate), aluminum tris (acetylacetonate), etc.

These compounds are aluminum chelate compounds containing alkoxy groups obtained by dissolving aluminum alcoholate in aprotic solvent, petroleum solvent, hydrocarbon solvent, ester solvent, ketone solvent, ether solvent, amide solvent, etc., and adding B-diketone, β-ketoester, monohydric or polyhydric alcohol, fatty acid, etc. to the above solution, and heating the mixture under reflux to cause a ligand displacement reaction.

The zirconia chelate compound includes for example: zirconium ethylate, zirconium alcoholate such as zirconium butyrate or these polymer, zirconium tributoxystearate, zirconium tetraacetylacetonate, zirconium tributoxyacetylacetonate, zirconium dibutoxybis (acetylacetonate), zirconium tributoxyethyl acetoacetate, zirconium hutoxyacetylacetonate his (ethyl acetoacetate), etc.

The titanium chelate compound includes: titanium alcoholates such as methyl titanate, ethyl titanate, isopropyl titanate, butyl titanate, 2-ethylhexyl titanate and these polymers, titanium acetylacetonate, titanium tetraacetylacetonate, titanium octylene glycolate, titanium ethyl acetoacetate, titanium lactate, titanium triethanol aminate, etc.

The silicon chelate compound includes for example: tetrafunctional silane compounds represented by a general formula: Si $(OR)_4$ (where R is the same or different monovalent hydrocarbon group having 1 to 6 carbon atoms) or a hydrolysis product thereof. Specific examples of the tetrafunctional silane compounds include: tetramethoxysilane, tetraethoxysilane, tetrapropoxysilane, tetrabutoxysila etc., and further includes: a silane monomer (or oligomer) in which part or all of the alkoxy groups of these alkoxysilane monomers are hydrolyzed to form silanol (Si—OH) groups, and polymers self-condensed through hydrolysis reaction.

Further, the hydrolysis product of a tetrafunctional silane compound (there is no proper terminology to designate an entire intermediate of the tetrafunctional silane compound) includes for example: a silane monomer in which a part or all of an alkoxy group is hydrolyzed to a silanol (Si—OH) group, oligomers of 4 to 5 flier, and polymers (silicone resin) having a weight average molecular weight (Mw) of about 800 to 8000. Note that in the course of the hydrolysis reaction, not all of the alkoxysilyl groups (SiC—OR) in the alkoxysilane monomer are hydrolyzed to silanol (Si—OH).

The zinc-based chelate compound preferably includes for example: organic zinc carboxylate such as zinc octylate, zinc laurate, zinc stearate, zinc acetylacetone chelate, benzoylacetone zinc chelate, dibenzoylmethane zinc chelate, ethyl zinc acetoacetate chelate, etc.

(2) Metallic Oligomer Compound

The metallic oligomer compound according to the present invention preferably includes for example: at least one selected from Al-based, Zr-based, Ti-based, Si-based, and Zn-based cyclic oligomer compounds, and among them, further preferably includes: cyclic aluminum oligomer compounds such as cyclic aluminum oxide octylate.

(3) Hydrolysis Products and Polymers of Metal Chelate Compounds and Metal Cyclic Oligomer Compounds In the present invention, the surface of the infrared absorbing fine particles according to the present invention is coated with hydrolysis product in which all of the alkoxy groups, ether bonds, and ester bonds in the above-described metal chelate compound and metal cyclic oligomer compound are hydrolyzed to form hydroxyl groups and carboxyl groups, partially hydrolyzed partial hydrolysis product, or and polymer that self-condensed through the hydrolysis reaction, thereby forming a coating layer, to obtain the surface-treated infrared absorbing fine particles according to the present invention.

Namely, the hydrolysis product in the present invention is a concept including a partial hydrolysis product.

However, for example, in a reaction system in which an organic solvent such as alcohol is interposed, not all of the alkoxy groups, ether bonds and ester bonds of the metal chelate compound or metal cyclic oligomer compound serving as a starting material are hydrolyzed depending on the kind and concentration of the organic solvent, generally, even if necessary and sufficient water exists in the system due to stoichiometric composition. Accordingly, some of them may become amorphous with carbon C incorporated in its molecule even after hydrolysis, depending on the conditions of the surface coating method described below.

As a result, the coating layer may contain an undecomposed metal chelate compound and/or metal cyclic oligomer compound, but there is no particular problem if the amount is small.

(4) Addition Amount of Surface Treating Agent

The above-described addition amount of the metal chelate compound or metal cyclic oligomer compound is preferably in a range of 0.1 part by mass or more and 1000 parts by mass or less, more preferably part by mass or more and 500 parts by mass or less, further preferably, 10 parts by mass or more and 150 parts by mass or less, in terms of a metal element based on 100 parts by mass of the infrared absorbing fine particles.

This is because when the metal chelate compound or the metal cyclic oligomer compound is 0.1 parts by mass or more, hydrolysis products of those compounds and polymers of the hydrolysis products exert the effect of coating the surface of the infrared absorbing fine particles, and the effect of improving moisture and heat resistance can be obtained.

Further, when the metal chelate compound or the metal cyclic oligomer compound is 1000 parts by mass or less, excessive adsorption on the infrared absorbing fine particles can be avoided. Further, an improvement of the moisture and heat resistance by the surface coating is not saturated, and an improvement of the coating effect can be expected.

Further, this is because when the metal chelate compound or the metal cyclic oligomer compound is 1,000 parts by mass or less, excessive adsorption on the infrared absorbing fine particles can be avoided, and it is possible to avoid a situation that the fine particles are easily granulated through the hydrolysis products of the metal chelate compound or the metal cyclic oligomer compound or the polymer of the hydrolysis product during the removal of the medium. Good transparency can be ensured by avoiding granulation of the undesired fine particles.

In addition, it is also possible to avoid an increase in a production cost due to an increase in the addition amount and the treatment time due to the excess of the metal chelate compound or the metal cyclic oligomer compound. Therefore, from an industrial point of view, the addition amount of the metal chelate compound or metal cyclic oligomer compound is preferably 1000 parts by mass or less.

[3] Surface Coating Method

In a surface coating method of the infrared absorbing tine particles according to the present invention, first, an infrared absorbing fine particle dispersion liquid for forming a coating layer (in some cases, referred to as "a coating layer-forming dispersion liquid" in the present invention) is prepared, the liquid having infrared absorbing fine particles dispersed in an appropriate medium. Then, a surface treating agent is added to the prepared coating layer-forming dispersion liquid, and the mixture is stirred. Then, the surface of the infrared absorbing fine particles is coated with a coating layer containing at least one selected from hydrolysis product of a metal chelate compound, polymer of hydrolysis product of a metal chelate compound, hydrolysis product of a metal cyclic oligomer compound, and polymer of hydrolysis product of a metal cyclic oligomer compound.

The surface coating method according to the present invention will be described hereafter in an order of (1) Preparation of a coating layer-forming dispersion liquid, (2) Preparation of a coating layer-forming dispersion liquid with water as a medium, (3) Preparation of a coating layer-forming dispersion liquid with addition amount of water adjusted, (4) Treatment after mixing and stirring in the coating layer-forming dispersion liquid.

(1) Preparation of a Coating Layer-Forming Dispersion Liquid

In the coating layer-forming dispersion liquid according to the present invention, it is preferable that the tungsten oxide and/or the composite tungsten oxide, which are the infrared absorbing fine particles, are finely pulverized in advance and dispersed in an appropriate medium to be in a monodispersed state. Then, it is important that the dispersed state is ensured during the pulverization and dispersion treatment step, and that the fine particles are not aggregated. This is because the following situation can be avoided: in the process of the surface treatment of the infrared absorbing fine particles, the fine particles cause aggregation, the fine particles are surface-coated in an aggregate state, eventually, the aggregate remains in the infrared absorbing fine particle dispersion body described below, and transparency of the infrared absorbing fine particle dispersion body and an infrared absorbing substrate described below decreases.

Accordingly, by performing the pulverization and dispersion treatment to the coating layer-forming dispersion liquid according to the present invention, the individual infrared absorbing fine particles can be uniformly and firmly coated with the hydrolysis product of the surface treating agent and the polymer of the hydrolysis product, when the surface treating agent according to the present invention is added.

Specific methods of the pulverization and dispersion treatment include for example: a pulverization/dispersion treatment method using devices such as bead mill, ball mill, sand mill, paint shaker, ultrasonic homogenizer. Among them, pulverizing and dispersing with a medium stirring mill such as a bead mill, a ball mill, a sand mill, and a paint shaker using medium media such as beads, balls and Ottawa sand, is preferable because the time to reach a desired dispersed particle size is short.

(2) Preparation of a Coating Layer-Forming Dispersion Liquid with Water as a Medium The present inventors found that in the preparation of the coating layer-forming dispersion liquid described above, it is preferable that while stirring and mixing the coating layer-forming dispersion liquid with water as a medium, the surface treating agent according to the present invention is added thereto, and further, a hydrolysis reaction of the added metal chelate compound and metal cyclic oligomer compound is immediately completed. In the present invention, the dispersion liquid may be referred to as "a coating layer-forming dispersion liquid with water as a medium".

It is considered that the preparation of the coating layer-forming dispersion liquid is affected by a reaction sequence of the added surface treating agent according to the present invention. Namely, the hydrolysis reaction of the surface treating agent always precedes the polymerization reaction of the generated hydrolysis product followed by the polymerization reaction of the generated hydrolysis product in the coating layer-forming dispersion liquid with water as a medium. As a result, it is considered that a residual amount of carbon C in the surface treating agent molecules present in the coating layer can be reduced, compared to a case without water as a medium, and it is considered that a high-density coating layer can be formed by reducing the residual amount of carbon C in the surface treating agent molecules present in the coating layer.

Note that the metal chelate compound, the metal cyclic oligomer compound, the hydrolysis products of them, and polymers of the hydrolysis products are decomposed to metal ions in the above-described coating layer-forming dispersion liquid with water as a medium, immediately after start of the addition. However, in this case, the decomposition to the metal ion ends at the timepoint of a saturated aqueous solution.

On the other hand, it is preferable that a dispersion concentration of the tungsten oxide and/or the composite tungsten oxide in the coating layer-forming dispersion liquid is 0.01 mass % or more and 80 mass % or less. When the dispersion concentration is within this range, pH can be adjusted to 8 or less, and the infrared absorbing fine particles according to the present invention maintain dispersion by electrostatic repulsion.

As a result, it is considered that surfaces of all infrared absorbing fine particles are coated with at least one selected from hydrolysis product of the metal chelate compound, polymer of hydrolysis product of the metal chelate compound, hydrolysis product of the metal cyclic oligomer compound, and polymer of hydrolysis product of the metal cyclic oligomer compound, and the surface-treated infrared absorbing fine particles according to the present invention are generated.

A thickness of the coating layer of the surface-treated infrared absorbing fine particles according to the present invention is preferably 0.5 nm or more. This is because when the thickness of the coating layer is 0.5 nm or more, it is considered that the surface-treated infrared absorbing fine particles exhibit sufficient moisture and heat resistance and chemical stability. On the other hand, it is considered that the thickness of the coating layer is preferably 100 nm or less, from a viewpoint that the surface-treated infrared absorbing fine particles secure predetermined optical properties. Further, the thickness is preferably 0.5 nm or more and 20 nm or less, more preferably 1 nm or more and 10 nm or less.

The thickness of the coating layer can be measured with a transmission electron microscope, and a portion without lattice fringes (arrangement of atoms in the crystal) of the infrared absorbing fine particles corresponds to the coating layer.

(3) Preparation of a Coating Layer-Forming Dispersion Liquid with an Addition Amount of Water Adjusted As a modified example of the method for preparing a coating layer-forming dispersion liquid with water as a medium described above, there is also a method for achieving the above-described reaction sequence while adjusting the addition amount of water to an appropriate value, using an organic solvent as the medium of the coating layer-forming dispersion liquid. In the present invention, the dispersion liquid with organic solvent as a medium may be referred to as "a coating layer-forming dispersion liquid with organic solvent as a medium".

This preparation method is also convenient when it is desired to reduce the amount of water contained in the coating layer-forming dispersion liquid due to the convenience of a subsequent step.

Specifically, the surface treating agent according to the present invention and pure water are dropped in parallel while stirring and mixing the coating layer-forming dispersion liquid with organic solvent as a medium. In this event, the temperature of the medium, which affects a reaction rate, and a dropping rate of the surface treating agent and pure water are appropriately controlled. Note that as the organic solvent, any solvent such as an alcohol-based, ketone-based, or glycol-based solvent that dissolves in water at room temperature may be used, and various solvents can be selected.

(4) Treatment After Mixing and Stirring in the Coating Layer-Forming Dispersion Liquid The surface-treated infrared absorbing fine particles according to the present invention obtained in the step of preparing the coating layer-forming dispersion liquid described above can be used in a state of fine particles, dispersed in a liquid medium or a solid medium, as a raw material of an infrared absorbing fine particle dispersion body and an infrared absorbing substrate.

Namely, the generated surface-treated infrared absorbing fine particles do not need to be further subjected to a heat treatment to increase the density and chemical stability of the coating layer. This is because the density and adhesion of the coating layer are sufficiently high so that a desired moisture and heat resistance can be obtained without the heat treatment.

However, it is possible to apply heat treatment to the coating layer-forming dispersion liquid and surface-treated infrared absorbing fine particle powder, for the purpose of obtaining the powder of the surface-treated infrared absorbing fine particles from the coating layer-forming dispersion liquid, and for the purpose of drying the obtained surface-treated infrared absorbing fine particle powder, and the like. However, in this case, care should be taken so that a heat treatment temperature does not exceed a temperature at which the surface-treated infrared absorbing fine particles strongly aggregate to form a strong aggregate.

This is because transparency is required in many cases for the surface-treated infrared absorbing fine particles according to the present invention, as a final used in the infrared absorbing fine particle dispersion body and the infrared absorbing substrate. When the infrared absorbing fine particle dispersion body and the infrared absorbing substrate are produced using an aggregate as an infrared absorbing material, those with a high degree of haze is obtained. When heat treatment is performed above the temperature at which strong aggregates are formed, the strong aggregate is disintegrated by dry or/and wet to be re-dispersed in order to ensure the transparency of the infrared absorbing fine particle dispersion body and the infrared absorbing substrate. However, when disintegrating and re-dispersing, it is considered that the coating layer on the surface of the surface-treated infrared absorbing fine particles is damaged, and in some cases, some of the coating layer peels off, and the surface of the fine particles is exposed.

As described above, since heat treatment is not required after the treatment after mixing and stirring, the surface-treated infrared absorbing fine particles according to the present invention does not cause strong aggregation, and therefore a dispersing process for disintegrating the strong aggregation is not required or short. As a result, the coating layer of the surface-treated infrared absorbing fine particles according to the present invention is not damaged and remains coated with the individual infrared absorbing fine particles. Then, it is considered that the infrared absorbing fine particle dispersion body and the infrared absorbing substrate produced using the surface-treated infrared absorbing fine particles, show better moisture and heat resistance than those obtained by conventional methods.

Further, as described above, by reducing the residual amount of carbon C in the surface treating agent molecules present in the coating layer, a high-density coating layer can be formed. From this viewpoint, carbon concentration contained in the surface-treated infrared absorbing fine particle powder containing the surface-treated infrared absorbing fine particles, is preferably 0.2 mass % or more and 5.0 mass % or less, more preferably, 0.5 mass % or more and 3.0 mass % or less.

[4] An Infrared Absorbing Fine Particle Dispersion Liquid, an Infrared Absorbing Fine Particle Dispersion Body, an Infrared Absorbing Substrate, and an Article Obtained by Using the Surface-Treated Infrared Absorbing Fine Particles According to the Present Invention An infrared absorbing fine particle dispersion body, an infrared absorbing substrate, and an article obtained using the surface-treated infrared absorbing fine particles according to the present invention, will be described in an order of (1) Infrared-absorbing fine particle dispersion liquid, (2) Infrared-absorbing fine particle dispersion body, (3) infrared-absorbing substrate, (4) Article using the infrared-absorbing fine particle dispersion body or the infrared-absorbing substrate.

(I) Infrared-Absorbing Fine Particle Dispersion Liquid

The infrared absorbing fine particle dispersion liquid according to the present invention has the surface-treated infrared absorbing fine particles according to the present invention dispersed in a liquid medium. As the liquid medium, one or more liquid media selected from organic solvents, oils and fats, liquid plasticizers, compounds polymerized by curing, and water can be used.

The infrared absorbing fine particle dispersion liquid according to the present invention will be described in an order of (i) a production method, (ii) an organic solvent to be used, (iii) fats and oils to be used, (iv) a liquid plasticizer to be used, (v) a compound to be polymerized by curing, (vi) a dispersant to be used, and (vii) a method for using the infrared absorbing fine particle dispersion liquid.

(i) A Production Method

To produce the infrared absorbing fine particle dispersion liquid according to the present invention, the above coating layer-forming dispersion liquid is heated and dried under conditions that can avoid strong aggregation of the surface-treated infrared absorbing fine particles, or dried for example vacuum fluidized drying, spray drying, etc., at room temperature, to obtain a surface-treated infrared absorbing fine particle powder according to the present invention. Then, the surface-treated infrared absorbing fine particle powder may be added to the above-described liquid medium and re-dispersed. Further, it is also preferable that the coating layer-forming dispersion liquid is separated into surface-treated infrared absorbing fine particles and a medium, and the medium of the coating layer-forming dispersion liquid is replaced with a medium of the infrared-absorbing fine particle dispersion liquid (so-called solvent replacement) to produce an infrared-absorbing fine particle dispersion liquid.

Since drying and disintegration are performed simultaneously under reduced pressure atmosphere in the treatment by vacuum fluidized drying, a drying speed is fast and aggregation of the surface-treated infrared absorbing fine particles can be avoided. Further, due to drying under reduced pressure atmosphere, volatile components can be removed even at relatively low temperature, and the residual amount of the volatile component can be reduced as much as possible. Further, in the treatment by spray drying, secondary aggregation due to a surface force of the volatile component is unlikely to occur, and surface-treated infrared absorbing fine particles that are not relatively secondary aggregated can be obtained without performing disintegration treatment.

On the other hand, it is also preferable that the medium of the coating layer-forming dispersion liquid and the medium of the infrared absorbing fine particle dispersion liquid are matched in advance, and the coating layer-forming dispersion liquid after the surface treatment is used as it is as an infrared absorbing fine particle dispersion liquid.

(ii) An Organic Solvent to be Used

As the organic solvent used in the infrared absorbing fine particle dispersion liquid according to the present invention, alcohol-based, ketone-based, hydrocarbon-based, glycol-based, water-based, and the like can be used.

Specifically, alcoholic solvents such as methanol, ethanol, 1-propanol, isopropanol, butanol, pentanol, benzyl alcohol, diacetone alcohol;

ketone solvents such as acetone, methyl ethyl ketone, methyl propyl ketone, methyl isobutyl ketone, cyclohexanone, isophorone;

ester solvents such as 3-methyl-methoxy-propionate;

glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, propylene glycol ethyl ether acetate;

amides such as formamide, N-methylformamide, dimethylformamide, dimethylacetamide, N-methyl-2-pyrrolidone;

aromatic hydrocarbons such as toluene and xylene;

ethylene chloride, chlorobenzene, etc., can be used.

Then, among these organic solvents, particularly, dimethyl ketone, methyl ethyl ketone, methyl isobutyl ketone, toluene, propylene glycol monomethyl ether acetate, n-butyl acetate, etc., can be preferably used.

(iii) Fats and Oils to be Used

As fats and oils used for the infrared absorbing fine particle dispersion liquid according to the present invention, vegetable fats and oils or vegetable-derived fats and oils are preferable.

As vegetable oil, dry oils such as linseed oil, sunflower oil, tung oil, eno oil, semi-dry oils such as sesame oil, cottonseed oil, rapeseed oil, soybean oil, rice bran oil, poppy oil, non-dry oils such as olive oil, coconut oil, palm oil, dehydrated castor oil, and the like can be used.

As compounds derived from the vegetable oils, fatty acid monoesters, ethers, etc. obtained by directly esterifying fatty acids of the vegetable oils with monoalcohols, can be used.

Further, commercially available petroleum solvents can also be used as fats and oils.

As a commercially available petroleum solvent, Isopar (registered trademark) E, Exol (registered trademark) Hexane, Heptane, E, D30, D40, D60, D80, D95, D110, D130 (all manufactured by ExxonMobil), etc., can be used.

(iv) A Liquid Plasticizer to be Used

As the liquid plasticizer used in the infrared absorbing fine particle dispersion liquid according to the present invention, for example, a plasticizer that is a compound of a monohydric alcohol and an organic acid ester, an ester-based plasticizer such as a polyhydric alcohol organic acid ester compound, a phosphoric acid plasticizer such as an organic phosphoric acid plasticizer, etc., can be used. Note that those which are liquid at room temperature are preferable.

Among them, a plasticizer which is an ester compound synthesized from a polyhydric alcohol and a fatty acid can be preferably used. The ester compound synthesized from polyhydric alcohol and fatty acid is not particularly limited, and includes for example, glycols such as triethylene glycol, tetraethylene glycol, and tripropylene glycol, a glycol ester compound obtained by a reaction between glycols such as triethylene glycol, tetraethylene glycol, tripropylene glycol, and monobasic organic acids such as butyric acid, isobutyric acid, caproic acid, 2-ethylbutyric acid, heptylic acid, n-octylic acid, 2-ethylhexylic acid, pelargonic acid (n-nonylic acid), and decylic acid, and also includes ester compounds of tetraethylene glycol and tripropylene glycol with the above-described monobasic organic compounds.

Among them, fatty acid esters of triethylene glycol such as triethylene glycol dihexanate, triethylene glycol di-2-ethyl butyrate, and triethylene glycol di-octanoate, triethylene glycol di-2-ethyl hexanonate, can be used. Further, fatty acid esters of triethylene glycol can also be preferably used.

(v) A Compound to be Polymerized by Curing

A compound to be polymerized by curing used in the infrared absorbing fine particle dispersion liquid according to the present invention is a monomer or oligomer that forms a polymer by polymerization or the like.

Specifically, methyl methacrylate monomers, acrylate monomers, styrene resin monomers, and the like can be used.

As described above, two or more liquid media can be used in combination. Further, acid or alkali may be added to these liquid media to adjust pH, if necessary.

(vi) A Dispersant to be Used

It is also preferable to add various dispersants, surfactants, coupling agents, and the like, into the infrared absorbing fine particle dispersion liquid according to the present invention, in order to further improve the dispersion stability of the surface-treated infrared absorbing fine particles and avoid coarsening of the dispersed particle size due to re-aggregation.

The dispersant, coupling agent and surfactant can be selected according to the application, but those having an amine-containing group, a hydroxyl group, a carboxyl group, a sulfo group, or an epoxy group as a functional group are preferable. These functional groups have an effect of adsorbing on the surface of the surface-treated infrared absorbing fine particles to prevent aggregation and disperse them uniformly. Polymeric dispersants having any of these functional groups in the molecule are more preferable.

Further, an acrylic-styrene copolymer-based dispersant having a functional group is also a preferable dispersant. Among them, more preferable examples are an acrylic-styrene copolymer dispersant having a carboxyl group as a functional group, and an acrylic dispersant having an amine-containing group as a functional group. The dispersant having a group containing an amine as a functional group preferably has a molecular weight Mw of 2,000 to 200,000 and an amine value of 5 to 100 mgKOH/g. Further, the dispersant having a carboxyl group preferably has a molecular weight Mw of 2,000 to 200,000 and an acid value of 1 to 50 mgKOH/g.

Preferable specific examples of commercially available dispersants include: SOLSPERSE (registered trademark) (the same applies hereinafter) 3000, 5000, 9000, 11200, 12000, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 71000, 76500, J180, J200, M387, etc., SOLPLUS (registered trademark) (hereinafter the same) D510, D520, D530, D540, DP310, K500, L300, L400, R700, etc., manufactured by Japan Lubrizol Corporation; Disperbyk (registered trademark) (the same applies hereinafter)—101, 102, 103, 106, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 191, 192, 2000, 2001, 2009, 2020, 2025, 2050, 2070, 2095, 2096, 2150, 2151, 2152, 2155, 2163, 2164, Anti-Terra (registered trademark) (the same applies hereinafter)—U, 203, 204 etc.; BYK (registered trademark) (the same applies hereinafter)—P104, P104S, P105, P9050, P9051, P9060, P9065, P9080, 051, 052, 053, 054, 055, 057, 063, 065, 066N, 067A, 077, 088, 141, 220S, 300, 302, 306, 307, 310, 315, 320, 322, 323, 325, 330, 331, 333, 337, 340, 345, 346, 347, 348, 350, 354, 355, 358N, 361N, 370, 375, 377, 378, 380N, 381, 392, 410, 425, 430, 1752, 4510, 6919, 9076, 9077, W909, W935, W940, W961, W966, W969, W972, W980, W985, W995, W996, W9010, Dynwet800, Silicon3700, UV3500, UV3510, UV3570, etc., manufactured by Big Chemie Japan; EFKA (registered trademark) (the same applies hereinafter) 2020, 2025 3030, 3031, 3236, 4008, 4009 4010, 4015, 4020, 4046, 4047, 4050, 4055, 4060, 4080, 4300, 4310, 4320, 4330, 4340, 4400, 4401, 4402, 4403, 4500, 5066, 5220, 6220, 6225, 6230, 6700, 6780, 6782, 7462, 8503, etc., manufactured by Ffka Additives; JONCRYL (registered trademark) (the same applies hereinafter) 67, 678, 586, 611, 680, 682, 690, 819,— JDX5050, etc., manufactured by BASF Japan; TERPLUS (registered trademark) (the same applies hereinafter) MD1000, D1180, D1130, etc., manufactured by Otsuka Chemical Co., Ltd.; Addispar (registered trademark) (the same applies hereinafter) PB-711, PB-821, PB-822, etc., manufactured by Ajinomoto Techno; Dispalon (registered trademark) (hereinafter the same) 1751N, 1831, 1850, 1860, 1934, DA-400N, DA-703-50, DA-325, DA-375, DA-550, DA-705, DA-725, DA-1401, DA-7301, DN-900, NS-5210 NV1-8514L, etc., manufactured by Kusumoto Chemicals; Alphon (registered trademark) (hereinafter the same) UH-2170, UC-3000, UC-3910, UC-3920, UF-5022, UG-4010, UG-4035, UG-4040, UG-4070, Reseda (registered trademark) (the same applies hereinafter) GS-1015, GP-301, GP-301S, etc., manufactured by Toagosei Co., Ltd.; Dianal (registered trademark) (the same applies hereinafter) BR-50, BR-52, BR-60, BR-73, BR-77, BR80, BR-83, BR85, BR87, BR88, BR-90, BR-96, BR102, BR-113, BR116, etc., manufactured by Mitsubishi Chemical Corporation.

(vii) A Method for Using the Infrared Absorbing Fine Particle Dispersion Liquid

The infrared absorbing fine particle dispersion liquid according to the present invention produced as described above can be applied to the surface of an appropriate substrate, and a dispersion layer can be formed thereon to be used as an infrared absorbing substrate. Namely, the dispersion layer is a kind of dried and solidified product of the infrared absorbing fine particle dispersion liquid.

It is also possible that the infrared-absorbing fine particle dispersion liquid is dried and pulverized to obtain a powdery infrared-absorbing fine particle dispersion body according to the present invention (which may be referred to as "dispersion powder" in the present invention). Namely, the dispersion powder is a kind of dried and solidified product of the infrared absorbing fine particle dispersion liquid. The dispersion powder is a powdery dispersion body in which the surface-treated infrared absorbing fine particles are dispersed in a solid medium (dispersant or the like), and is distinguished from the above-described surface-treated infrared absorbing fine particle powder. The dispersion powder contains a dispersant, and therefore by mixing with a suitable medium, the surface-treated infrared absorbing fine particles can be easily re-dispersed in the medium.

The dispersion powder can be used as a raw material for adding the surface-treated infrared absorbing fine particles in a dispersed state to an infrared absorbing product. Namely, the dispersion powder in which the surface-treated infrared absorbing fine particles according to the present invention are dispersed in a solid medium is dispersed again in a liquid medium, and may be used as a dispersion liquid for infrared absorbing products, or may be used by kneading the dispersion powder in a resin as described later.

On the other hand, the infrared-absorbing fine particle dispersion liquid obtained by mixing and dispersing the surface-treated infrared-absorbing fine particles according to the present invention in a liquid medium is used for various applications utilizing photothermal conversion.

For example, a curable ink composition can be obtained by adding the surface-treated infrared absorbing fine particles to uncured thermosetting resin, or by adding the surface-treated infrared absorbing fine particles to uncured thermosetting resin after dispersing the surface-treated infrared absorbing fine particles according to the present invention in an appropriate solvent. The curable ink composition is provided on a predetermined substrate, and has excellent adhesion to the substrate when cured by irradiation with infrared light. In addition, the curable ink composition according to the present invention is suitable for stereolithography including: coating the substrate with a predetermined amount of the ink composition; irradiating the coated matter with near-infrared light, curing the coated matter to heap up; and forming a three-dimensional object to be described later, in addition to conventional ink applications.

(2) Infrared Absorbing Fine Particle Dispersion Body

The infrared-absorbing fine particle dispersion body according to the present invention has the surface-treated infrared absorbing fine particles according to the present invention dispersed in a solid medium. Note that as the solid medium, a solid medium such as resin and glass can be used.

The infrared absorbing fine particle dispersion body according to the present invention will be described in an order of (i) production method, and (ii) moisture and heat resistance.

(i) Production Method

When the surface-treated infrared absorbing fine particles according to the present invention are kneaded into a resin and molded into a film or board, the surface-treated infrared absorbing fine particles can be directly kneaded into the resin. Further, it is also possible to mix the infrared absorbing fine particle dispersion liquid and resin, or possible to add a powdery dispersion body in which the surface-treated infrared absorbing fine particles are dispersed in a solid medium to a liquid medium to be mixed with a resin.

When a resin is used as a solid medium, for example, the dispersion body may be in the form of a film or board having a thickness of 0.1 μm to 50 mm.

Generally, when kneading the surface-treated infrared absorbing fine particles according to the present invention into a resin, the surface-treated infrared absorbing fine particles are mixed, heated, and kneaded at a temperature near a melting point of the resin (about 200 to 300° C.).

In this case, further, the surface-treated infrared absorbing fine particles are mixed with a resin to form pellets, and the pellets can be formed into a film or a board by each method, and for example can be formed into a film or a board by an extrusion molding method, an inflation molding method, a solution casting method, a casting method, or the like. At this time, a thickness of the film or board may be appropriately set according to the purpose of use, and an amount of a filler relative to resin (that is, an amount of the surface-treated infrared absorbing fine particles according to the present invention) is variable depending on a thickness of a substrate, required optical and mechanical properties, but is generally, 50 mass % or less relative to resin.

When the amount of the filler relative to resin is 50 mass % or less, granulation of the fine particles in solid resin can be avoided, and therefore good transparency can be maintained. Further, the use amount of the surface-treated infrared absorbing fine particles according to the present invention can be controlled, which is advantageous in cost.

On the other hand, the infrared-absorbing fine particle dispersion body obtained by dispersing the surface-treated infrared-absorbing fine particles according to the present invention in a solid medium can be used even in a state of being further pulverized into a powder. When adopting this configuration, the surface-treated infrared absorbing fine particles according to the present invention are already sufficiently dispersed in the solid medium, in the powdery infrared-absorbing fine particle dispersion body. Accordingly, a liquid or solid infrared absorbing fine particle dispersion body can be easily produced by using the powdery infrared absorbing fine particle dispersion body as a so-called masterbatch and dissolving it in an appropriate liquid medium, or kneading with resin pellets or the like.

Further, the resin serving as the matrix of the above-described film or board is not particularly limited and can be selected according to the purpose of use. As a low-cost, highly transparent and versatile resin, PET resin, acrylic resin, polyamide resin, vinyl chloride resin, polycarbonate resin, olefin resin, epoxy resin, polyimide resin, etc., can be used.

(ii) Moisture and Heat Resistance

When the dispersion body set to have a visible light transmittance of about 80% was exposed to a humid atmosphere at temperature of 85° C. and humidity of 90% for 9 days, the amount of change in visible light transmittance before and after the exposure is 2.0% or less, and the infrared absorbing fine particle dispersion body according to the present invention has excellent moisture and heat resistance.

(3) Infrared Absorbing Substrate

The infrared absorbing substrate according to the present invention has a dispersion layer containing the surface-treated infrared absorbing fine particles according to the present invention formed on a predetermined substrate surface.

By forming the dispersion layer containing the surface-treated infrared absorbing fine particles according to the present invention on a predetermined substrate surface, the infrared absorbing substrate according to the present invention is excellent in moisture and heat resistance and chemical stability, and can be suitably used as an infrared absorbing material.

The infrared absorbing substrate according to the present invention will be described in an order of (i) a production method, and (ii) a moisture and heat resistance.

(i) A Production Method

For example, an infrared absorbing substrate in which an infrared absorbing fine particle dispersion body is directly laminated on the substrate surface, can be obtained by coating an appropriate substrate surface with an infrared absorbing fine particle dispersion liquid in which the surface-treated infrared-absorbing fine particles according to the present invention are mixed with an organic solvent such as alcohol or a liquid medium such as water, a resin binder and, if desired, a dispersant.

The resin binder component can be selected according to the purpose of use, and examples thereof include an ultraviolet curable resin, a thermosetting resin, a room temperature curable resin, a thermoplastic resin, and the like. On the other hand, the infrared-absorbing; fine particle dispersion liquid containing no resin binder component may be laminated on the substrate surface as the infrared-absorbing fine particle dispersion body, or after the lamination, a liquid medium containing the binder component may be applied onto the layer of the infrared absorbing fine particle dispersion body.

Specifically, there is an infrared-absorbing substrate obtained by coating the substrate surface with a liquid infrared absorbing fine particle dispersion body in which the surface-treated infrared absorbing fine particles are dispersed in at least one liquid medium selected from an organic solvent, an organic solvent in which a resin is dissolved, an organic solvent in which a resin is dispersed, and water, and by hardening the obtained coating layer by an appropriate method. There is also an infrared-absorbing substrate obtained by coating the substrate surface with a liquid infrared absorbing fine particle dispersion body containing a resin binder component, and by hardening the obtained coating layer by an appropriate method. Further, there is also an infrared-absorbing substrate obtained by coating the substrate surface with an infrared absorbing fine particle dispersion body obtained by mixing in a predetermined medium the infrared absorbing fine particle dispersion body in which the surface-treated infrared absorbing fine particles are dispersed in a powdery solid medium, and by hardening the obtained coating layer by an appropriate method. Of course, there is also an infrared-absorbing; substrate obtained by coating the substrate surface with an infrared absorbing fine particle dispersion liquid in which two or more kinds of various infrared absorbing fine particle dispersion liquids are mixed, and by hardening the obtained coating layer by an appropriate method.

The material of the above-described base material is not particularly limited as long as it is a transparent body, but glass, a resin board, a resin sheet, and a resin film are preferably used.

As the resin used for the resin board, the resin sheet, and the resin film, there is no particular limitation as long as there is no problem with a required surface condition and durability of the board, sheet and film. It is acceptable to use for example: boards, sheets, and films made of transparent polymers such as polyester polymers such as polyethylene terephthalate and polyethylene naphthalate, cellulose polymers such as diacetyl cellulose and triacetyl cellulose, polycarbonate-based polymers, acrylic polymers such as poly methyl methacrylate, styrene-based polymers such as polystyrene and acrylonitrile-styrene copolymer, olefin polymers such as polyolefin and ethylene/propylene copolymer having a polyethylene, polypropylene, cyclic or norbornene structure, amide polymers such as vinyl chloride polymers and aromatic polyamides, imide polymer, sulfone polymer, polyether sulfone polymer, polyether ether ketone polymer, polyphenylene sulfide polymer, vinyl alcohol polymer, vinylidene chloride polymer, vinyl butyral polymer, arylate polymer, polyoxymethylene polymer, epoxy-based polymers and their binary and tertiary copolymers, graft copolymers, blends. Particularly, polyester-based biaxially oriented film such as polyethylene terephthalate, polybutylene terephthalate or polyethylsene-2,6-naphthalate, is preferable in terms of mechanical properties, optical properties, heat resistance and economy. The polyester-based biaxially oriented film may be a copolymerized polyester-based film.

(ii) Moisture and Heat Resistance

When the infrared absorbing substrate set to have a visible light transmittance of about 80% was exposed to a humid atmosphere at temperature of 85° C. and humidity of 90% for 9 days, the amount of change in visible light transmittance before and after the exposure is 2.0% or less, and the above infrared absorbing substrate has excellent moisture and heat resistance.

(4) Article Using the Infrared-Absorbing Fine Particle Dispersion Body or the Infrared-Absorbing Substrate As described above, the infrared-absorbing articles such as the infrared-absorbing fine particle dispersion body and the infrared-absorbing substrate, such as films and boards, according to the present invention have excellent moisture and heat resistance and chemical stability.

Therefore, for example, these infrared absorbing articles are used for PDP (Plasma Display Panel) such as window materials for various buildings and vehicles that aim to suppress a temperature rise in the room while maintaining a brightness by shielding infrared light while sufficiently taking in visible light, and can be suitably used for a filter or the like for shielding infrared light emitted forward from the PDP.

Further, since the surface-treated infrared absorbing fine particles according to the present invention have absorption in the infrared region, the surface-treated infrared absorbing fine particles absorb infrared light with specific wavelength, when a printing surface containing the surface-treated infrared absorbing fine particles is irradiated with an infrared laser. Accordingly, an anti-counterfeit printed matter obtained by printing an anti-counterfeit ink containing the surface-treated infrared absorbing fine particles on one side or both sides of a substrate to be printed, can fudge an authenticity of the printed matter by irradiating infrared light having a specific wavelength and reading a difference in an amount of reflection or transmission. The anti-counterfeit printed matter is an example of the infrared absorbing fine particle dispersion body according to the present invention.

Further, a light-to-heat conversion layer can be formed by producing an ink by mixing the infrared absorbing fine particle dispersion liquid according to the present invention and the binder component, coating a substrate with this ink and drying the ink, then, curing the dried ink. The light-to-heat conversion layer can emit heat only at a desired position with high position accuracy by irradiation of an electromagnetic wave laser such as infrared light, and applicable in a wide range of fields such as electronics, medical care, agriculture, machinery and the like, and can be used for example, donor sheet used when forming an organic electroluminescence device by a laser transfer method, and thermal paper for thermal printers and ink ribbon for thermal transfer printers. The light-to-heat conversion layer is an example of the infrared-absorbing fine particle dispersion body according to the present invention.

Further, infrared absorbing fiber is obtained by dispersing the surface-treated infrared absorbing fine particles according to the present invention in an appropriate medium, and including the dispersion matter on the surface and/or inside of the fiber. When adopting this configuration, the infrared absorbing fiber absorbs near infrared light from sunlight etc., by containing surface-treated infrared absorbing fine particles efficiently, and becomes the infrared absorbing fiber with excellent heat retention, and simultaneously, transmits light in the visible light region, and therefore becomes an infrared absorbing fiber with excellent design. As a result, the infrared absorbing fiber can be used for various applications such as clothing for winterization requiring heat retention, sports clothing, stockings, textile products such as curtains, and other industrial textile products. The infrared absorbing fiber is an example of the infrared absorbing fine particle dispersion body according to the present invention.

Further, the film-like or board-like infrared absorbing fine particle dispersion body according to the present invention can be applied to materials used for roofs and outer wall materials of agricultural and horticultural houses, and can be used as a thermal insulation material for agricultural and horticultural facilities with thermal insulation by transmitting visible light and securing light necessary for photosynthesis of plants in the agricultural and horticultural house, by efficiently absorbing other light such as near-infrared light included in sunlight. The heat insulating material for agricultural and horticultural facilities is an example of the infrared absorbing fine particle dispersion body according to the present invention.

EXAMPLES

The present invention will be specifically described hereafter, with reference to examples. However, the present invention is not limited to the following examples.

A dispersed particle size of fine particles in a dispersion liquid in Examples and Comparative Examples was shown by an average value measured by a particle size measuring device (ELS-8000 manufactured by Otsuka Electronics Co., Ltd.) based on a dynamic light scattering method. Further, a crystallite size was calculated by powder X-ray diffraction ($\theta$–$2\theta$ method) using a powder X-ray diffractometer (X'Pert-PRO/MPD manufactured by SPECTALIS, Inc., PANalytical).

A thickness of the coating layer of the surface-treated infrared absorbing fine particles was obtained by reading an area without lattice fringes of the infrared absorbing fine particles as a coating layer, from 300,000-fold photographic data obtained using a transmission electron microscope (Hitachi Ltd. HF-2200).

Optical properties of an infrared absorbing sheet were measured using a spectrophotometer (U-4100 manufactured by Hitachi, Ltd.), and a visible light transmittance and a solar transmittance were calculated according to JISR3106.

A haze value of the infrared absorbing sheet was measured using a haze meter (HM-150, manufactured by Murakami Color Co., Ltd.) and calculated according to JIS K7105.

As a method for evaluating a moisture and heat resistance of the infrared absorbing sheet, the infrared absorbing sheet having a visible light transmittance of about 80% is exposed to a humid atmosphere at temperature of 85° C. and humidity of 90% for 9 days, and, for example, in the case of hexagonal cesium tungsten bronze, those having a change in solar transmittance of 2.0% or less before and after the exposure were judged to have good moisture and heat resistance, those having a change amount exceeding 2.0% were judged to have insufficient moisture and heat resistance.

Note that here, the optical property values (visible light transmittance, haze value) of the infrared absorbing sheet are values including the optical property values of the resin sheet as a substrate.

Example 1

25 mass % of hexagonal cesium tungsten bronze with Cs/W (molar ratio)=0.33 ($Cs_{0.33}WO_z$, $2.0 \leq z \leq 3.0$) powder CWO (registered trademark) (YM-01 manufactured by Sumitomo Metal Mining Co., Ltd.) and 75 mass % of pure water were mixed to obtain a mixture, and the mixture was charged into a paint shaker containing 0.3 mm$\varphi$$ZrO_2$ beads, and pulverized and dispersed for 10 hours, to obtain a $Cs_{0.33}WO_z$ fine particle dispersion liquid according to Example 1. The dispersed particle size of $Cs_{0.33}WO_z$ fine particles in the obtained dispersion liquid was measured, and it was found to be 100 nm. Note that as a setting for measuring the dispersed particle size, a particle refractive index was set to 1.81, and a particle shape was set to non-spherical. Further, a background was measured with pure water and a solvent refractive index was set to 1.33. Further, after removing the solvent of the obtained dispersion liquid, the crystallite size was measured, and it was found to be 32 nm. The obtained $Cs_{0.33}WO_z$ fine particle dispersion liquid was mixed with pure water, to obtain a dispersion liquid A for forming a coating layer according to Example 1 (referred to as a coating layer-forming dispersion liquid A hereafter) in which a concentration of the $Cs_{0.33}WO_z$ fine particles was 2 mass %.

On the other hand, 2.5 mass % of aluminum ethyl acetoacetate diisopropylate as an aluminum chelate compound and 97.5 mass % of isopropyl alcohol (IPA) were mixed, to obtain a surface treating agent dilute solution a.

890 g of the obtained coating layer-forming dispersion liquid A was put in a beaker, and 360 g of the surface treating agent dilute solution a was added thereto dropwise over 3 hours while performing strong stirring with a stirrer with blades. After the dropwise addition of the surface treating agent dilute solution a, stirring was further performed at a temperature of 20° C. for 24 hours, to produce a ripened liquid according to Example 1. Subsequently, a medium is evaporated from the ripened liquid by vacuum fluidized drying, to obtain a powder containing the surface-treated infrared absorbing fine particles according to Example 1 (surface-treated infrared absorbing fine particle powder).

Figure 2:
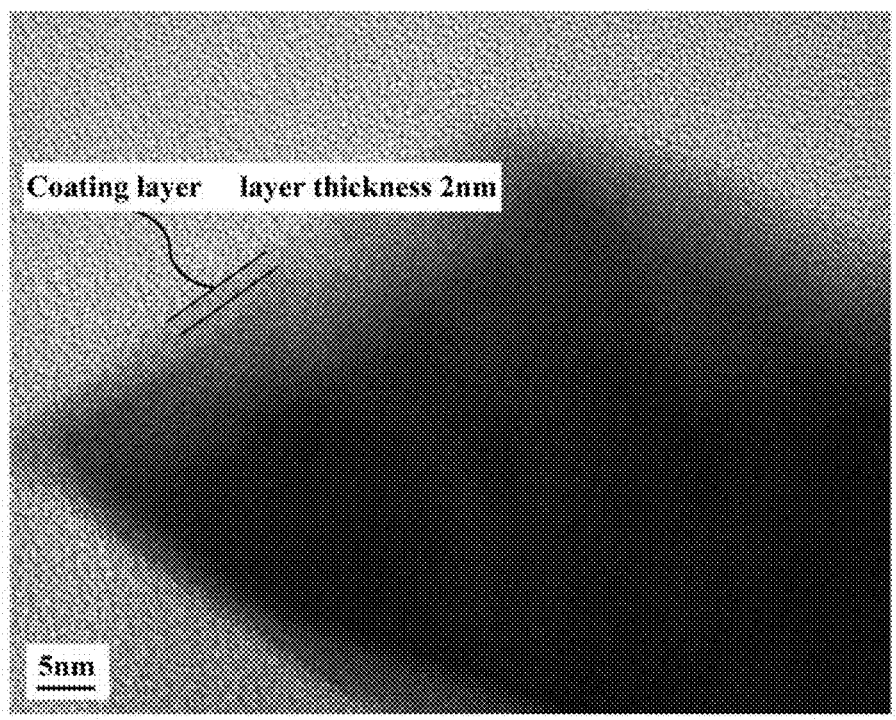
FIG. 2 is a transmission electron micrograph of surface-treated infrared absorbing fine particles according to Example 1 at a magnification of 300,000.

Here, a thickness of the coating layer of the surface-treated infrared absorbing tine particles according to Example 1 was measured by a transmission electron microscope, and it was found to be 2 nm. Note that FIG. 2 shows a transmission electron micrograph of the surface-treated infrared absorbing fine particles according to Example 1 at a magnification of 300,000.

8 mass % of the surface-treated infrared absorbing fine particles according to Example 1, 24 mass % of a polyacrylate dispersant, and 68 mass % of toluene were mixed. The obtained mixture was charged into a paint shaker containing 0.3 mmφ $ZrO_2$ beads, and pulverized and dispersed for 1 hour, to obtain an infrared absorbing fine particle dispersion liquid according to Example 1. Subsequently, a medium was evaporated from the infrared absorbing fine particle dispersion liquid by vacuum fluidized drying, to obtain an infrared absorbing fine particle dispersion powder according to Example 1.

The infrared absorbing fine particle dispersion powder according to Example 1 and a polycarbonate resin were dry-blended such that the visible light transmittance of an infrared absorbing sheet obtained later was about 80%. (In this example, the particles were blended such that the concentration of the surface-treated infrared absorbing fine particles was 0.06 wt %). The obtained blended matter was kneaded at 290° C. using a twin-screw extruder, extruded from T die, formed in a 0.75 mm thick sheet material by a calender roll method, to obtain an infrared absorbing sheet according to Example 1. Note that the infrared absorbing sheet is an example of the infrared absorbing fine particle dispersion body according to the present invention.

Optical properties of the obtained infrared absorbing sheet according to Example 1 were measured, and it was found that the visible light transmittance was 79.6%, the solar transmittance was 48.6%, and the haze was 0.9%.

After the obtained infrared absorbing sheet according to Example 1 was exposed to a humid atmosphere at temperature of 85° C. and humidity of 90% for 9 days, optical properties were measured, and it was found that the visible light transmittance was 80.2%, the solar transmittance was 49.5%, and the haze was 0.9%. It was also found that the change in visible light transmittance due to exposure to humid atmosphere was 0.6%, and the change in solar transmittance was 0.9%, both of which were small, and the haze did not change. The production conditions are shown in Table 1, and the evaluation results are shown in Table 3.

Examples 2 and 3

A surface-treated infrared absorbing fine particle powder, an infrared absorbing fine particle dispersion liquid, an infrared absorbing fine particle dispersion powder, and an infrared absorbing sheet according to Examples 2 and 3 were obtained in the same manner as in Example 1 except that the amount of the surface treating agent dilute solution a and the dropping addition time were changed, and the same evaluation as in Example 1 was performed. The production conditions are shown in Table 1, and the evaluation results are shown in Table 3.

Examples 4

The ripened liquid according to Example 1 was allowed to stand for 1 hour, and the surface-treated infrared absorbing fine particles and the medium were subjected to solid-liquid separation. Subsequently, only the medium that was a supernatant was removed to obtain a slurry of the infrared absorbing fine particles. Isopropyl alcohol was added to the obtained infrared absorbing fine particle slurry, then, the mixture was allowed to stand for 1 hour while stirring for 1 hour, and the surface-treated infrared absorbing fine particles and the medium were subjected to solid-liquid separation again. Subsequently, only the medium that was a supernatant was removed, to obtain the slurry of the infrared ray absorbing fine particles again.

16 mass % of the obtained infrared absorbing fine particle slurry, 24 mass % of polyacrylate dispersant and 60 mass % of toluene were mixed and stirred, then, subjected to dispersion treatment using an ultrasonic homogenizer to obtain an infrared absorbing fine particle dispersion liquid according to Example 4.

An infrared absorbing fine particle dispersion powder and an infrared absorbing sheet according to Example 4 were obtained in the same manner as in Example 1 except that the infrared absorbing fine particle dispersion liquid according to Example 4 was used, and the same evaluation as in Example 1 was performed. The production conditions are shown in Table 1, and the evaluation results are shown in Table 3. Note *1 in Table 1 indicates that the surface-treated infrared absorbing fine particles and the medium were subjected to solid-liquid separation.

Example 5

2.4 mass % of zirconium tributoxyacetylacetonate and 97.6 mass % of isopropyl alcohol were mixed to obtain a surface treating agent dilute solution b according to Example 5. A surface-treated infrared absorbing fine particle powder, an infrared absorbing fine particle dispersion liquid, an infrared absorbing fine particle dispersion powder, and an infrared absorbing sheet according to Example 5 were obtained in the same manner as in Example 1 except that the surface treating agent dilute solution b was used instead of the surface treating agent dilute solution a, and the same evaluation as in Example 1 was performed. The production conditions are shown in Table 1, and the evaluation results are shown in Table 3.

Example 6

2.6 mass % of diisopropoxytitanium bisethylacetoacetate and 97.4 mass % of isopropyl alcohol were mixed to obtain a surface treating agent dilute solution c according to Example 6. A surface-treated infrared absorbing fine particle powder, an infrared absorbing fine particle dispersion liquid, an infrared absorbing fine particle dispersion powder, and an infrared absorbing sheet according to Example 6 were obtained in the same manner as in Example 1 except that the surface treating agent dilute solution c was used instead of the surface treating agent dilute solution a, and the same evaluation as in Example 1 was performed. The production conditions are shown in Table 1, and the evaluation results are shown in Table 3.

Example 7

A surface-treated infrared absorbing fine particle powder, an infrared absorbing fine particle dispersion liquid, an infrared absorbing fine particle dispersion powder, and an infrared absorbing sheet according to Example 7 were obtained in the same manner as in Example 1 except that polymethyl methacrylate resin was used instead of the polycarbonate resin as a solid resin, and the same evaluation as in Example 1 was performed. The production conditions are shown in Table 1, and the evaluation results are shown in Table 3.

Example 8

25 mass % of cubic sodium tungsten bronze powder with Na/W (molar ratio)=0.33 (manufactured by Sumitomo Metal Mining Co., Ltd.) and 75 mass % of isopropyl alcohol were mixed, and the obtained mixture was charged into a paint shaker containing 0.3 mmφ $ZrO_2$ beads, and pulverized and dispersed for 10 hours, to obtain a $Na_{0.33}WO_z$ fine particle dispersion liquid according to Example 8. The dispersed particle size of the $Na_{0.33}WO_z$ fine particles in the obtained dispersion liquid was measured, and it was found to be 100 nm. Note that as a setting for measuring the dispersed particle size, a particle refractive index was set to 1.81, and a particle shape was set to non-spherical. Further, a background was measured with isopropyl alcohol and a solvent refractive index was set to 1.38. Further, after removing the solvent of the obtained dispersion liquid, the crystallite size was measured, and it was found to be 32 nm.

The $Na_{0.33}WO_z$ fine particle dispersion liquid according to Example 8 was mixed with isopropyl alcohol, to obtain a coating layer-forming dispersion liquid B in which a concentration of the infrared absorbing fine particles (cubic sodium tungsten bronze fine particles) was 2%. 520 g of the obtained coating layer-forming dispersion liquid B was put in a beaker, and 360 g of the surface treating agent dilute solution a and 100 g of pure water as a diluent d were added thereto dropwise over 3 hours while performing strong stirring with a stirrer with blades, After the dropwise addition, stirring was performed at a temperature of 20° C. for 24 hours, to produce a ripened liquid according to Example 8. Subsequently, a medium was evaporated from the ripened liquid by vacuum fluidized drying, to obtain a surface-treated infrared absorbing fine particle powder according to Example 8.

An infrared absorbing fine particle dispersion liquid, an infrared absorbing fine particle dispersion powder, and an infrared absorbing sheet according to Example 8 were obtained in the same manner as in Example 1 except that the surface-treated infrared absorbing fine particle powder according to Example 8 was used instead of the surface-treated infrared absorbing fine particle powder according to Example 1, and the same evaluation as in Example 1 was performed. The production conditions are shown in Table 1, and the evaluation results are shown in Table 3. Note *2 in Table 1 indicates that the diluent d is pure water, Note *5 indicates that the drop amount of a is 360 g, drop amount of d is 100 g, and Note *7 indicates that a and d are dropped in parallel.

Examples 9 to 11

The dispersed particle size and the crystallite size of the infrared absorbing fine particles were measured in the same manner as in Example 1 except that the hexagonal potassium tungsten bronze powder with K/W (molar ratio)=0.33 (Example 9), the hexagonal rubidium tungsten bronze powder with Rb/W (molar ratio)=0.33 (Example 10), and magnesium phase $W_{18}O_{49}$ (Example 11) were used instead of the hexagonal cesium tungsten bronze powder, to obtain coating layer-forming dispersion liquids C to E.

A surface-treated infrared absorbing fine particle powder, an infrared absorbing fine particle dispersion liquid, an infrared absorbing fine particle dispersion powder, and an infrared absorbing sheet according to Examples 9 to 11 were obtained in the same manner as in Example 1 except that the coating layer-forming dispersion liquids C to E were used instead of the coating layer-forming dispersion liquid A, and the same evaluation was performed. The production conditions are shown in Table 1, and the evaluation results are shown in Table 3.

Examples 12 and 13

25 mass % of hexagonal cesium tungsten bronze ($Cs_{0.33}WO_z$) with Cs/W (molar ratio)=0.33 (manufactured by Sumitomo Metal Mining Co., Ltd.) and 75 mass % of pure water were mixed, and the obtained mixture was charged into a paint shaker containing 0.3 mmφ $ZrO_2$ beads, and pulverized and dispersed for 6 hours (Example 12) or 4 hours (Example 13), to obtain a $Cs_{0.33}WO_z$ fine particle dispersion liquid according to Examples 12 and 13.

The dispersed particle sizes of the $Cs_{0.33}WO_z$ fine particles in the dispersion liquids according to Examples 12 and 13 were measured, and they were found to be 140 nm, 120 nm respectively. Note that as a setting for measuring the dispersed particle size, a particle refractive index was set to 1.81, and a particle shape was set to non-spherical. Further, a background was measured with pure water and a solvent refractive index was set to 1.33.

Further, after removing the solvent of the obtained dispersion liquid, the crystallite sizes $Cs_{0.33}WO_z$ fine particles according to Examples 12 and 13 were measured, and they were found to be 50 nm and 42 nm respectively.

The obtained $Cs_{0.33}WO_z$ fine particle dispersion liquids according to Examples 12 and 13 were mixed with pure water to obtain coating layer-forming dispersion liquids F and G according to Examples 12 and 13 in which the concentration of $Cs_{0.33}WO_z$ fine particles was 2 mass %.

A surface-treated infrared absorbing fine particle powder, an infrared absorbing fine particle dispersion liquid, an infrared absorbing fine particle dispersion powder, and an infrared absorbing sheet according to Examples 12 and 13 were obtained in the same manner as in Example 2 except that the coating layer-forming dispersion liquids F and G were used instead of the coating layer-forming dispersion liquid A. The production conditions are shown in Table 1, and the evaluation results are shown in Table 3.

Example 14

A surface-treated infrared absorbing fine particle powder, an infrared absorbing fine particle dispersion liquid, an infrared absorbing fine particle dispersion powder, and an infrared absorbing sheet according to Example 14 were obtained in the same manner as in Example 1 except that 309 g of tetraethoxysilane was used as a surface treating agent e, the surface treating agent e was used instead of the surface treating agent dilute solution a, and no isopropyl alcohol was added, and the same evaluation as in Example 1 was performed. The production conditions are shown in Table 1, and the evaluation results are shown in Table 3.

Example 15

4.4 mass % of zinc acetylacetonate and 95.6 mass % of isopropyl alcohol were mixed to obtain a surface treating agent dilute solution f according to Example 15. A surface-treated infrared absorbing fine particle powder, an infrared absorbing fine particle dispersion liquid, an. infrared absorbing fine particle dispersion powder, and an infrared absorbing sheet according to Example 15 were obtained in the same manner as in Example 1 except that the surface treating agent dilute solution f was used instead of the surface treating agent dilute solution a. The production conditions are shown in Table 1, and the evaluation results are shown in Table 3.

Example 16

Powder containing the surface-treated infrared absorbing fine particles (surface-treated infrared absorbing fine particle powder) according to Example 16 was obtained by evaporating the medium from the ripened liquid according to Example 1 by spray drying instead of vacuum fluidized drying. Otherwise, in the same manner as in Example 1, an infrared absorbing fine particle dispersion liquid, an infrared absorbing fine particle dispersion powder, and an infrared absorbing sheet according to Example 16 were obtained, and the same evaluation as in Example 1 was performed. The production conditions are shown in Table 1, and the evaluation results are shown in Table 3.

Comparative Example 1

7 mass % of hexagonal cesium tungsten bronze powder, 24 mass % of polyacrylate dispersant and 69 mass % of toluene were mixed to obtain a mixture, and the mixture was charged into a paint shaker containing 0,3 mmφ$ZrO_2$ beads, and pulverized and dispersed for 4 hours, to obtain a coating layer-forming dispersion liquid H according to Comparative Example 1. The dispersed particle size of the infrared absorbing fine particles in the obtained coating layer-forming dispersion liquid H was measured, and it was found to be 100 nm. Note that as a setting for measuring the dispersed particle size, a particle refractive index was set to 1.81, and a particle shape was set to non-spherical. Further, a background was measured with toluene and a solvent refractive index was set to 1.50. Further, after removing the solvent of the obtained dispersion liquid, the crystallite size was measured, and it was found to be 32 nm. Subsequently, an infrared absorbing fine particle dispersion liquid according to Comparative Example 1 was used as it was without adding a surface treating agent to the coating layer-forming dispersion liquid H. The medium was evaporated from the infrared-absorbing fine particle dispersion liquid according to Comparative Example 1 by vacuum fluidized drying to obtain an infrared-absorbing fine particle dispersion powder according to Comparative Example 1.

The infrared-absorbing fine particle dispersion powder according to Comparative Example 1 and a polycarbonate resin were dry-blended so that the concentration of the infrared-absorbing fine particles was 0.075 wt %. The obtained blended matter was kneaded at 290° C. using a twin-screw extruder, extruded from T die, formed in a 0.75 mm thick sheet material by a calender roll method, to obtain an infrared absorbing sheet according to Comparative Example 1.

Optical properties of the obtained infrared absorbing sheet according to Comparative Example 1 were measured, and it was found that a visible light transmittance was 79.2%, a solar transmittance was 48.4%, and a haze was 1.0%.

The obtained infrared-absorbing sheet according to Comparative Example 1 was exposed to a humid atmosphere at temperature of 85° C. and humidity of 90% for 9 days, then, its optical properties were measured, and it was found that the visible light transmittance was 81.2%, the solar transmittance was 52.6%, and the haze was 1.2%. The change in visible light transmittance due to exposure to a humid atmosphere was 2.0%, the change in solar transmittance was 4.2%, which were found to be large compared with an Example. Further, the rate of change in haze was 0.2%. The production conditions are shown in Table 2, and the evaluation results are shown in Table 4.

Comparative Example 2

An infrared absorbing fine particle dispersion liquid, an infrared absorbing fine particle dispersion powder, and an infrared absorbing sheet according to Comparative Example 2. were obtained in the same manner as in Comparative Example 1 except that polymethyl methacrylate resin was used instead of polycarbonate resin as a solid resin, and the same evaluation as in Example 1 was performed. The production conditions are shown in Table 2, and the evaluation results are shown in Table 4.

Comparative Examples 3 to 6

An infrared absorbing fine particle dispersion liquid, an infrared absorbing fine particle dispersion powder, and an infrared absorbing sheet according to Comparative Examples 3 to 6 were obtained in the same manner as in Comparative Example 1 except that cubic sodium tungsten bronze powder with Na/W (molar ratio)=0.33 (Comparative Example 3), hexagonal potassium tungsten bronze powder with K/W (molar ratio) 0.33 (Comparative Example 4), hexagonal rubidium tungsten bronze powder with Rb/W (molar ratio)=0.33 (Comparative Example 5), or magnesium phase $W_{18}O_{49}$ (Comparative Example 6) was used instead of the hexagonal cesium tungsten bronze powder, and the same evaluation as in Example 1 was performed. The production conditions are shown in Table 2, and the evaluation results are shown in Table 4.

Comparative Example 7

13 mass % of hexagonal cesium tungsten bronze powder with Cs/W (molar ratio)=0.33 and 87 mass % of isopropyl alcohol were mixed, and the obtained mixture was charged into a paint shaker containing 0.3 mmφ $ZrO_2$ beads, and pulverized and dispersed for 5 hours, to obtain a $Cs_{0.33}WO_z$ fine particle dispersion liquid according to Comparative Example 7. The dispersed particle size of the $Na_{0.33}WO_z$ fine particles in the obtained dispersion liquid was measured, and it was found to be 100 nm. Note that as a setting for measuring the dispersed particle size, a particle refractive index was set to 1.81, and a particle shape was set to non-spherical. Further, a background was measured with isopropyl alcohol and a solvent refractive index was set to 1.38. Further, after removing the solvent of the obtained dispersion liquid, the crystallite size was measured, and it was found to be 32 nm.

$Cs_{0.33}WO_z$ fine particle dispersion liquid according to Comparative Example 7 and isopropyl alcohol were mixed, to obtain a coating layer-forming dispersion liquid I in which the concentration of infrared absorbing fine particles (hexagonal cesium tungsten bronze fine particles) was 3.5%. 21 g of aluminum ethyl acetoacetate diisopropylate was added to 733 g of the obtained coating layer-forming dispersion liquid 1, then mixed and stirred, and subjected to dispersion treatment using an ultrasonic homogenizer.

Subsequently, the obtained dispersed material was put in a beaker, and 100 g of pure water was added thereto dropwise over 1 hour while performing strong stirring with a stirrer with blades. Further, 140 g of tetraethoxysilane was added dropwise over 2 hours as a surface treating agent e' while performing stirring, then, the mixture was stirred at 20° C. for 15 hours, and the solution was heated and aged at 70° C. for 2 hours. Subsequently, a medium was evaporated from the ripened liquid by vacuum fluidized drying, and further, heat treatment was performed at a temperature of 200° C. for 1 hour in a nitrogen atmosphere to obtain surface-treated infrared absorbing fine particle powder according to Comparative Example 7.

8 mass % of the surface-treated infrared absorbing fine particles according to Comparative Example 7, 24 mass % of a polyacrylate dispersant, and 68 mass % of toluene were mixed. The obtained mixture was charged into a paint shaker containing 0.3 mmφ $ZrO_2$ beads, and the mixture was pulverized and dispersed for 5 hours to obtain an infrared absorbing fine particle dispersion liquid according to Comparative Example 7.

An infrared absorbing fine particle dispersion powder and an infrared absorbing sheet according to Comparative Example 7 were obtained in the same manner as in Example 1 except that the infrared absorbing fine particle dispersion liquid according to Comparative Example 7 was used instead of the infrared absorbing fine particle dispersion liquid according to Example 1, and the same evaluation as in Example 1 was performed. The production conditions are shown in Table 2, and the evaluation results are shown in Table 4. Note *3 in Table 2 indicates that the diluent d is pure water, and Note *4 indicates that 21 g of aluminum ethyl acetoacetate diisopropylate was added before adding water/tetraethoxysilane, and Note *6 indicates that the drop amount of water was 100 g and the drop amount of tetraethoxysilane was 140 g, and Note *8 indicates that the drop time of water is 1 hour and the drop time of tetraethoxysilane is 2 hours.

TABLE 1

| | Infrared absorbing fine particles | aa | | | Surface treating agent diluent | | | | | |
| | | bb [Time] | Addition amount [mass %] | Dispersion medium | Surface treating agent Kind | | Addition amount [mass %] | IPA Addition amount [mass %] | Drop amount [g] | Drip time [h] | Matrix resin |
|---|---|---|---|---|---|---|---|---|---|---|---|
| Example 1 | hexagonal | A | 10 | 2 | water | a | cc | 2.5 | 97.5 | 360 | 3 | polycarbonate |
| Example 2 | cesium | A | 10 | 2 | | a | | 2.5 | 97.5 | 1800 | 15 | |
| Example 3 | tungsten | A | 10 | 2 | | a | | 2.5 | 97.5 | 3600 | 30 | |
| Example 4 | bronze | A | 10 | 2 | | a*1 | | 2.5 | 97.5 | 360 | 3 | |
| Example 5 | | A | 10 | 2 | | b | dd | 2.4 | 97.6 | 360 | 3 | |
| Example 6 | | A | 10 | 2 | | c | ee | 2.6 | 97.4 | 360 | 3 | |
| Example 7 | | A | 10 | 2 | | a | cc | 2.5 | 97.5 | 360 | 3 | polymethyl methacrylate |
| Example 8 | cubic sodium tungsten bronze | B | 10 | 2 | IPA | a/d*2 | | 2.5 | 97.5 | 360/100*5 | 3*7 | polycarbonate |
| Example 9 | hexagonal potassium tungsten bronze | C | 10 | 2 | water | a | | 2.5 | 97.5 | 360 | 3 | |
| Example 10 | hexagonal rubidium tungsten bronze | D | 10 | 2 | | a | | 2.5 | 97.5 | 360 | 3 | |
| Example 11 | $W_{18}O_{49}$ | E | 10 | 2 | | a | | 2.5 | 97.5 | 360 | 3 | |
| Example 12 | hexagonal | F | 6 | 2 | | a | | 2.5 | 97.5 | 360 | 15 | |
| Example 13 | cesium | G | 4 | 2 | | a | | 2.5 | 97.5 | 360 | 15 | |
| Example 14 | tungsten bronze | A | 10 | 2 | | e | tetraethoxysilane | 100 | — | 309 | 3 | |

TABLE 1-continued

| | Infrared absorbing fine particles | aa bb [Time] | Addition amount [mass %] | Dispersion medium | Surface treating agent Kind | Addition amount [mass %] | IPA Addition amount [mass %] | Drop amount [g] | Drip time [h] | Matrix resin |
|---|---|---|---|---|---|---|---|---|---|---|
| Example 15 | A | 10 | 2 | f | zinc acetylacetonate | 4.4 | 95.6 | 360 | 3 | |
| Example 16 | A | 10 | 2 | a | cc | 2.5 | 97.5 | 360 | 3 | | aa = Coating layer-forming dispersion liquid
bb = Pulverization and dispersion treatment
cc = aluminum ethyl acetoacetate diisopropylate
dd = zirconium tributoxyacetylacetonate
ee = diisopropoxytitanium bisethylacetoacetate

TABLE 2

| | Infrared absorbing fine particles | Coating layer-forming dispersion liquid | | | | Surface treating agent diluent | | | | | Matrix resin |
|---|---|---|---|---|---|---|---|---|---|---|---|
| | | aa [Time] | Addition amount [mass %] | Dispersion medium | | bb Kind | Addition amount [mass %] | IPA Addition amount [mass %] | Drop amount [g] | Drip time [h] | |
| Comparative Example 1 | hexagonal cesium tungsten bronze | H | 4 | 7 | toluene | — | — | — | — | — | polycarbonate |
| Comparative Example 2 | hexagonal cesium tungsten bronze | H | 4 | 7 | | — | — | — | — | — | polymethyl methacrylate |
| Comparative Example 3 | cubic sodium tungsten bronze | H | 4 | 7 | | — | — | — | — | — | polycarbonate |
| Comparative Example 4 | hexagonal potassium tungsten bronze | H | 4 | 7 | | — | — | — | — | — | |
| Comparative Example 5 | hexagonal rubidium tungsten bronze | H | 4 | 7 | | — | — | — | — | — | |
| Comparative Example 6 | $W_{18}O_{49}$ | H | 4 | 7 | | — | — | — | — | — | |
| Comparative Example 7 | hexagonal cesium tungsten bronze | I | 5 | 3.5 | IPA | d/e**[3] | tetra-ethoxysilane*[4] | | 100/140*[6] | 1/2*[8] | | aa = Pulverization and dispersion treatment
bb = Surface treating agent
In Table 1 and Table 2,
*[1]in Table 1 indicates that the surface-treated infrared absorbing fine particles and the medium were subjected to solid-liquid separation.
*[2]indicates that the diluent d is pure water.
*[3]indicates that the diluent d is pure water.
*[4]indicates that 21 g of aluminum ethyl acetoacetate diisopropylate was added before adding water/tetraethoxysilane.
*[5]indicates that the drop amount of a is 360 g, drop amount of d is 100 g.
*[6]indicates that the drop of amount of water was 100 g and the drop of amount of tetraethoxysilane was 140 g
*[7]indicates that a and d are dropped in parallel.
*[8]indicates that the drop time of water is 1 hour and the drop time of tetraethoxysilane is 2 hours.

TABLE 3

| | Surface-treating infrared absorbing fine particles | | Infrared absorbing sheet | | | | | | | | |
|---|---|---|---|---|---|---|---|---|---|---|---|
| | Crystallite size in dispersion liquid [nm] | Coating layer thickness [nm] | Initial time | | | After exposure to a humid atmosphere for 9 days | | | Change in amount after exposure | | |
| | | | Visible light transmittance [%] | Solar transmittance [%] | Haze [%] | Visible light transmittance [%] | Solar transmittance [%] | Haze [%] | Visible light transmittance [%] | Solar transmittance [%] | Haze [%] |
| Example 1 | 32 | 2 | 79.6 | 48.6 | 0.9 | 80.2 | 49.5 | 0.9 | 0.6 | 0.9 | 0.0 |
| Example 2 | 32 | 10 | 79.8 | 48.5 | 0.9 | 80.3 | 49.3 | 0.9 | 0.5 | 0.8 | 0.0 |

TABLE 3-continued

| | Surface-treating infrared absorbing fine particles | | Infrared absorbing sheet | | | | | | | | |
|---|---|---|---|---|---|---|---|---|---|---|---|
| | Crystallite size in | Coating | Initial time | | | After exposure to a humid atmosphere for 9 days | | | Change in amount after exposure | | |
| | dispersion liquid [nm] | layer thickness [nm] | Visible light transmittance [%] | Solar transmittance [%] | Haze [%] | Visible light transmittance [%] | Solar transmittance [%] | Haze [%] | Visible light transmittance [%] | Solar transmittance [%] | Haze [%] |
| Example 3 | 32 | 20 | 80.2 | 49.1 | 0.8 | 80.6 | 49.8 | 0.9 | 0.4 | 0.7 | 0.1 |
| Example 4 | 32 | 2 | 80.1 | 49.0 | 0.9 | 80.7 | 49.9 | 0.9 | 0.6 | 0.9 | 0.0 |
| Example 5 | 32 | 2 | 80.2 | 49.0 | 1.0 | 81.5 | 50.9 | 1.0 | 1.3 | 1.9 | 0.0 |
| Example 6 | 32 | 2 | 80.4 | 49.1 | 1.0 | 81.8 | 51.1 | 1.0 | 1.4 | 2.0 | 0.0 |
| Example 7 | 32 | 2 | 79.7 | 48.4 | 1.0 | 80.2 | 49.1 | 1.1 | 0.5 | 0.7 | 0.1 |
| Example 8 | 32 | 2 | 79.4 | 57.3 | 1.3 | 80.4 | 58.9 | 1.4 | 1.0 | 1.6 | 0.1 |
| Example 9 | 32 | 2 | 79.5 | 56.0 | 1.2 | 80.2 | 57.0 | 1.3 | 0.7 | 1.0 | 0.1 |
| Example 10 | 32 | 2 | 79.5 | 50.1 | 1.1 | 80.1 | 51.1 | 1.1 | 0.6 | 1.0 | 0.0 |
| Example 11 | 32 | 2 | 79.5 | 65.4 | 0.9 | 80.5 | 66.4 | 0.9 | 1.0 | 1.0 | 0.0 |
| Example 12 | 42 | 10 | 79.9 | 48.7 | 0.9 | 80.4 | 49.4 | 0.9 | 0.5 | 0.7 | 0.0 |
| Example 13 | 50 | 10 | 79.8 | 48.6 | 0.9 | 80.3 | 49.3 | 0.9 | 0.5 | 0.7 | 0.0 |
| Example 14 | 32 | 2 | 79.7 | 48.9 | 1.3 | 81.6 | 51.1 | 1.4 | 1.9 | 2.2 | 0.1 |
| Example 15 | 32 | 2 | 79.8 | 48.7 | 0.9 | 81.0 | 50.5 | 0.9 | 1.2 | 1.8 | 0.0 |
| Example 16 | 32 | 2 | 80.0 | 48.9 | 0.9 | 80.6 | 49.8 | 0.9 | 0.6 | 0.9 | 0.0 |

TABLE 4

| | Surface-treating infrared absorbing fine particles | | Infrared absorbing sheet | | | | | | | | |
|---|---|---|---|---|---|---|---|---|---|---|---|
| | Crystallite size in | Coating | Initial time | | | After exposure to a humid atmosphere for 9 days | | | Change in amount after exposure | | |
| | dispersion liquid [nm] | layer thickness [nm] | Visible light transmittance [%] | Solar transmittance [%] | Haze [%] | Visible light transmittance [%] | Solar transmittance [%] | Haze [%] | Visible light transmittance [%] | Solar transmittance [%] | Haze [%] |
| Comparative Example 1 | 32 | — | 79.2 | 48.4 | 1.0 | 81.2 | 52.6 | 1.2 | 2.0 | 4.2 | 0.2 |
| Comparative Example 2 | 32 | — | 79.3 | 48.6 | 1.0 | 81.0 | 51.6 | 1.3 | 1.7 | 3.0 | 0.3 |
| Comparative Example 3 | 32 | — | 79.5 | 57.4 | 1.0 | 83.1 | 63.9 | 1.5 | 3.6 | 6.5 | 0.5 |
| Comparative Example 4 | 32 | — | 79.4 | 55.9 | 1.1 | 81.8 | 59.7 | 1.2 | 2.4 | 3.8 | 0.2 |
| Comparative Example 5 | 32 | — | 79.5 | 50.0 | 1.1 | 81.5 | 53.4 | 1.1 | 2.0 | 3.4 | 0.0 |
| Comparative Example 6 | 32 | — | 79.6 | 65.5 | 1.1 | 83.6 | 69.3 | 1.1 | 4.0 | 3.8 | 0.0 |
| Comparative Example 7 | 32 | 10 | 80.1 | 49.1 | 1.5 | 81.8 | 51.6 | 1.9 | 1.7 | 2.5 | 0.4 |

The invention claimed is:

1. Surface-treated infrared absorbing fine particles, wherein
a surface of infrared absorbing particles is coated with a coating layer containing at least one component selected from the group consisting of a hydrolysis product of a metal chelate compound, a polymer of a hydrolysis product of a metal chelate compound, a hydrolysis product of a metal cyclic oligomer compound, and a polymer of a hydrolysis product of a metal cyclic oligomer compound,
the component has a hydroxyl group or a carboxyl group, and
the metal chelate compound or the metal cyclic oligomer compound contains at least one metal element selected from Al, Zr, Ti, and Zn.

2. The surface-treated infrared absorbing fine particles according to the claim 1, wherein a thickness of the coating layer is 0.5 nm or more.

3. The surface-treated infrared absorbing fine particles according to claim 1, wherein the metal chelate compound or the metal cyclic oligomer compound contains.

4. The surface-treated infrared absorbing fine particles according to claim 1, wherein the metal chelate compound or the metal cyclic oligomer compound has at least one selected from an ether bond, an ester bond, an alkoxy group, and an acetyl group.

5. The surface-treated infrared absorbing fine particles according to claim 1, wherein the infrared absorbing fine particles are the infrared absorbing fine particles represented by a general formula WyOz (where W is tungsten, O is oxygen, satisfying $2.2 \leq z/y \leq 2.999$), and/or a general formula MxWyOz (where M is one or more elements selected from H, He, alkali metal, alkaline earth metal, rare earth element, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, and W is tungsten, O is oxygen, satisfying $0.001 \leq x/y \leq 1, 2.2 \leq z/y \leq 3.0$).

6. A surface-treated infrared absorbing fine particle powder containing the surface-treated infrared absorbing fine particles of claim 1.

7. The surface-treated infrared absorbing fine particle powder according to claim 6, wherein a carbon concentration is 0.2 mass % or more and 5.0 mass % or less.

8. An infrared-absorbing fine particle dispersion liquid, wherein the surface-treated infrared absorbing fine particles of claim 1 are dispersed in a predetermined liquid medium.

9. The infrared absorbing fine particle dispersion liquid according to claim 8, wherein the liquid medium is at least one liquid medium selected from an organic solvent, oil and fat, a liquid plasticizer, a compound polymerized by curing, and water.

10. An infrared-absorbing fine particle dispersion body, wherein the surface-treated infrared absorbing fine particles of claim 1 are dispersed in a predetermined solid resin.

11. The infrared absorbing fine particle dispersion body according to claim 10, wherein the solid resin is at least one resin selected from a fluororesin, PET resin, acrylic resin, polyamide resin, vinyl chloride resin, polycarbonate resin, olefin resin, epoxy resin, and polyimide resin.

12. An infrared absorbing fine particle dispersion body, which is a dried and solidified product of the infrared absorbing fine particle dispersion liquid of claim 8.

13. A method for producing surface-treated infrared absorbing fine particles, comprising:
mixing infrared absorbing fine particles and water, and performing a dispersion treatment to obtain a coating layer-forming dispersion liquid with water as a medium;
adding a metal chelate compound and / or a metal cyclic oligomer compound while stirring the coating layer-forming dispersion liquid with water as a medium;
continuing the stirring after the addition, and coating a surface of the infrared absorbing fine particles with a coating layer containing at least one component selected from hydrolysis product of a metal chelate compound, polymer of hydrolysis product of a metal chelate compound, hydrolysis product of a metal cyclic oligomer compound, and polymer of hydrolysis product of a metal cyclic oligomer compound, wherein the component has a hydroxyl group or a carboxyl group, and the metal chelate compound or the metal cyclic oligomer compound contains at least one metal element selected from Al, Zr, Ti, and Zn, to obtain an infrared absorbing fine particle dispersion liquid.

14. A method for producing surface-treated infrared absorbing fine particles, comprising:
mixing infrared absorbing fine particles and an organic solvent, performing a dispersion treatment, to obtain a coating layer-forming dispersion liquid with the organic solvent as a medium;
simultaneously adding a metal chelate compound or / and a metal cyclic oligomer compound and water in parallel while stirring the coating layer-forming dispersion liquid with the organic solvent as a medium;
continuing the stirring after the addition, and coating a surface of the infrared absorbing fine particles with a coating layer containing at least one component selected from hydrolysis product of a metal chelate compound, polymer of hydrolysis product of a metal chelate compound, hydrolysis product of a metal cyclic oligomer compound, and polymer of hydrolysis product of a metal cyclic oligomer compound, wherein the component has a hydroxyl group or a carboxyl group, and the metal chelate compound or the metal cyclic oligomer compound contains at least one metal element selected from Al, Zr, Ti, and Zn, to obtain an organic solvent dispersion liquid of infrared absorbing fine particles.

15. The method for producing surface-treated infrared absorbing fine particles according to claim 13, wherein the metal chelate compound and/or the metal cyclic oligomer compound contains Zn.

16. The method for producing surface-treated infrared absorbing fine particles according to claim 13, wherein the infrared absorbing fine particles are the infrared absorbing fine particles represented by a general formula WyOz (where W is tungsten, 0 is oxygen, satisfying $2.2 \leq z/y \leq 2.999$), and/or a general formula MxWyOz (where M is one or more elements selected from H, He, alkali metal, alkaline earth metal, rare earth element, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, W is tungsten, O is oxygen, satisfying $0.001 \leq x/y \leq 1$, $2.2 \leq z/y \leq 3.0$).

17. A method for producing a surface-treated infrared absorbing fine particle powder; comprising:
removing the medium from the coating layer-forming dispersion liquid with water as a medium according to claim 13 to obtain a surface-treated infrared absorbing fine particle powder containing surface-treated infrared absorbing fine particles.

18. A method for producing a surface-treated infrared absorbing fine particle powder according to claim 17, wherein a concentration of carbon contained in the surface-treated infrared absorbing fine particle powder is 0.2 mass % or more and 5.0 mass % or less.

19. A method for producing an infrared absorbing fine particle dispersion liquid, comprising:
adding the surface-treated infrared absorbing fine particle powder of claim 17 to a predetermined medium and dispersing the same.

20. A method for producing an infrared absorbing fine particle dispersion liquid, comprising:
exchanging the medium of the coating layer-forming dispersion liquid with water as a medium according to claim 13 to a predetermined medium.

21. A method for producing an infrared absorbing fine particle dispersion liquid, comprising:
exchanging the medium of the dispersion liquid to a predetermined medium in advance, the dispersion liquid being the coating layer-forming dispersion liquid with water as a medium according to claim 13; thereby
using the resulting dispersion liquid as an infrared absorbing fine particle dispersion liquid, the resulting dispersion liquid being the coating layer-forming dispersion liquid with water as a medium according to claim 13.

22. A method for producing an infrared absorbing fine particle dispersion body, comprising:
coating a surface of a predetermined substrate with the infrared-absorbing fine particle dispersion liquid obtained by the method for producing an infrared-absorbing fine particle dispersion liquid according to claim 19 and drying the same, to obtain an infrared absorbing fine particle dispersion body.

23. A method for producing an infrared absorbing fine particle dispersion body, comprising:
dispersing in a predetermined solid resin either one of the surface-treated infrared absorbing fine particle powder obtained by the method for producing a surface-treated infrared absorbing fine particle powder according to claim 17, or the infrared absorbing fine particle dispersion liquid obtained by the method for producing an infrared absorbing fine particle dispersion liquid comprising:

adding the surface-treated infrared absorbing fine particle powder of claim 17 to a predetermined medium and dispersing the same.

\* \* \* \* \*